(12) United States Patent
Benbrahim

(10) Patent No.: US 8,015,595 B2
(45) Date of Patent: Sep. 6, 2011

(54) METHODS AND APPARATUS FOR NEGOTIATING COMMUNICATIONS WITHIN A GAMING NETWORK

(75) Inventor: Jamal Benbrahim, Reno, NV (US)

(73) Assignee: IGT, Reno, NV (US)

( * ) Notice: Subject to any disclaimer, the term of this patent is extended or adjusted under 35 U.S.C. 154(b) by 1124 days.

(21) Appl. No.: 10/948,387

(22) Filed: Sep. 23, 2004

(65) Prior Publication Data

US 2006/0063594 A1    Mar. 23, 2006

(51) Int. Cl.
    *G06F 15/16*      (2006.01)
(52) U.S. Cl. ............... 726/4; 726/2; 726/26; 380/251; 380/278; 713/158; 713/187; 713/188
(58) Field of Classification Search .................. 726/4
See application file for complete search history.

(56) References Cited

U.S. PATENT DOCUMENTS

| | | | | |
|---|---|---|---|---|
| 5,759,102 | A | 6/1998 | Pease et al. | 463/42 |
| 6,149,522 | A * | 11/2000 | Alcorn et al. | 463/29 |
| 6,189,101 | B1 * | 2/2001 | Dusenbury, Jr. | 726/2 |
| 6,272,223 | B1 * | 8/2001 | Carlson | 380/251 |
| 6,475,089 | B1 * | 11/2002 | Lee | 463/40 |
| 6,629,591 | B1 | 10/2003 | Griswold et al. | 194/205 |
| 6,682,423 | B2 | 1/2004 | Brosnan et al. | 463/29 |
| 6,714,966 | B1 * | 3/2004 | Holt et al. | 709/204 |
| 6,722,986 | B1 * | 4/2004 | Lyons et al. | 463/29 |
| 6,805,634 | B1 | 10/2004 | Wells et al. | 463/42 |
| 6,878,062 | B2 * | 4/2005 | Bjorklund et al. | 463/17 |
| 6,939,233 | B2 * | 9/2005 | Emmerson | 463/41 |
| 6,957,349 | B1 * | 10/2005 | Yasukura | 726/26 |
| 7,228,434 | B2 * | 6/2007 | Zisowski | 713/187 |
| 7,260,834 | B1 * | 8/2007 | Carlson | 726/4 |
| 2002/0049909 | A1 * | 4/2002 | Jackson et al. | 713/188 |
| 2002/0116615 | A1 | 8/2002 | Nguyen et al. | 713/168 |
| 2002/0126846 | A1 * | 9/2002 | Multerer et al. | 380/251 |

(Continued)

FOREIGN PATENT DOCUMENTS

EP      1238690      11/2002

OTHER PUBLICATIONS

Menezes A et al: "Handbook of Applied Cryptograhy", 1996, pp. 543-590.*

(Continued)

*Primary Examiner* — Kambiz Zand
*Assistant Examiner* — Yonas Bayou
(74) *Attorney, Agent, or Firm* — Weaver Austin Villeneuve & Sampson LLP

(57) ABSTRACT

A gaming system may include a gaming security arbiter, and first and second network gaming devices, each including a processor and a memory operatively coupled to the processor. The arbiter controller may be programmed to receive a request from the first network gaming device for a communication session between the first network gaming device and the second network gaming device, to provide a first encryption key to the first network gaming device and to provide a second encryption key to a second network gaming device. The first controller may transmit the request to the gaming security arbiter, receive the first encryption key, encrypt a message using the first encryption key and transmit the encrypted message to the second network gaming device. The second controller may be programmed to receive the second encryption key, receive the encrypted message and decrypt the encrypted message using the second encryption key.

9 Claims, 18 Drawing Sheets

U.S. PATENT DOCUMENTS

| | | | |
|---|---|---|---|
| 2002/0165023 A1 | 11/2002 | Brosnan et al. | 463/29 |
| 2002/0187828 A1 | 12/2002 | Benbrahim | 463/29 |
| 2003/0050118 A1* | 3/2003 | Suzuki et al. | 463/42 |
| 2003/0228912 A1 | 12/2003 | Wells et al. | 463/43 |
| 2004/0097288 A1* | 5/2004 | Sloate et al. | 463/42 |
| 2004/0132532 A1 | 7/2004 | Brosnan et al. | 463/42 |
| 2004/0198494 A1 | 10/2004 | Nguyen et al. | 463/42 |
| 2005/0193209 A1* | 9/2005 | Saunders et al. | 713/182 |
| 2008/0032788 A1* | 2/2008 | Carlson | 463/29 |

OTHER PUBLICATIONS

International Search Report, dated Jan. 16, 2006 from corresponding International Application No. PCT/US2005/033602, 5 pages.

Written Opinion of the International Searching Authority, dated Jan. 16, 2006 from corresponding International Application No. PCT/US2005/033602, 7 pages.

Menezes, A. et al., "Handbook of Applied Cryptography, Key Management Techniques," Handbook of Applied Cryptography, 1996, pp. 543-590.

Neuman, B.C., et al., "Kerberos: An Authentication Service for Computer Networks" IEEE Communications Magazine, IEEE Service Center, New York, NY, vol. 32, No. 9, Sep. 1, 1994, pp. 33-38, ISSN: 0163-6804.

* cited by examiner

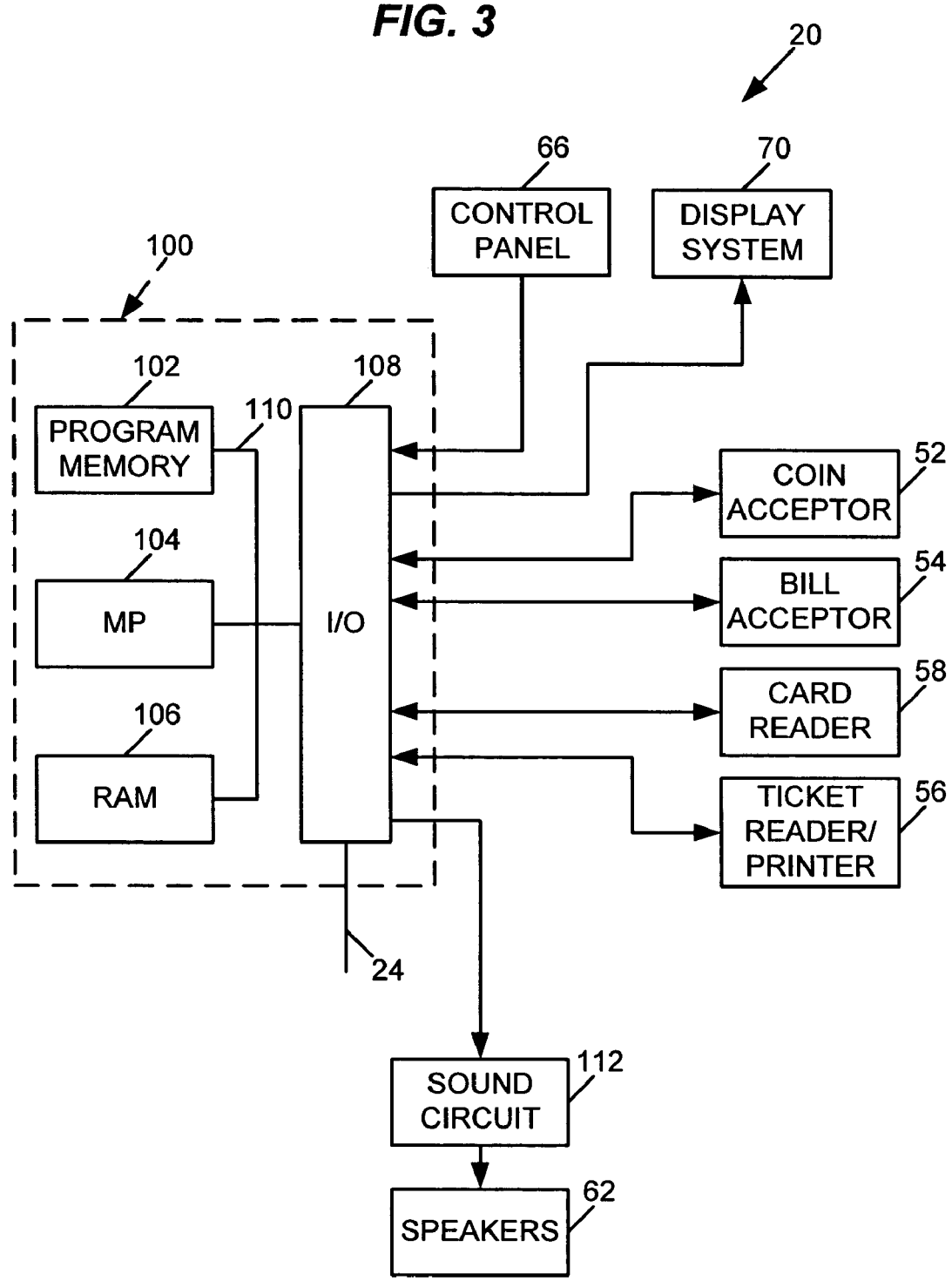

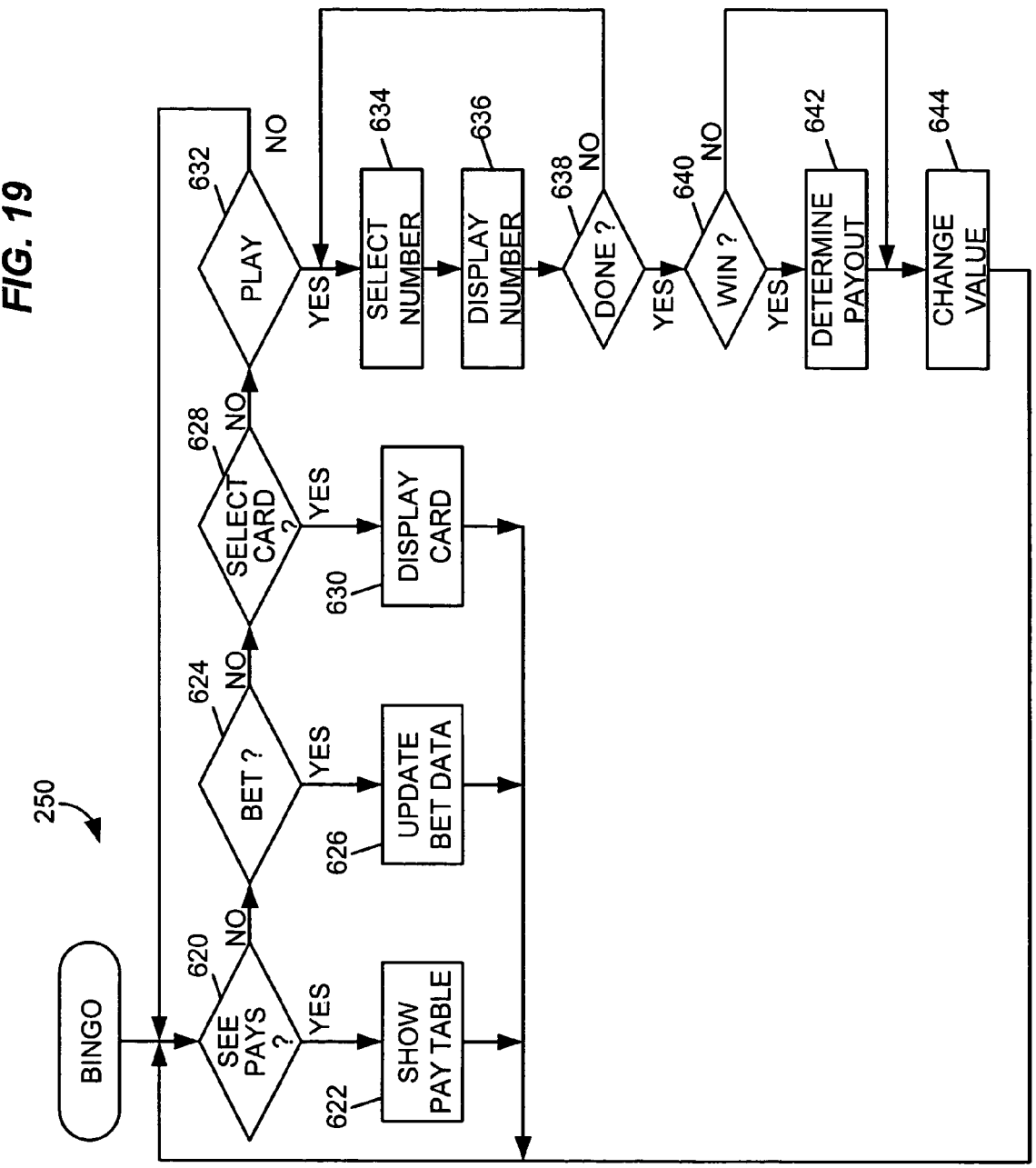

METHODS AND APPARATUS FOR NEGOTIATING COMMUNICATIONS WITHIN A GAMING NETWORK

BACKGROUND

This patent is directed to a casino gaming apparatus, which could be either an individual gaming unit or a casino gaming system having a plurality of gaming units, each gaming unit capable of secure communication within the casino gaming system.

A gaming apparatus of the type used in casinos has included a display unit such as a video display unit or a set of mechanical slot machine reels, a value input device such as a coin slot or paper currency reader, and a controller operatively coupled to the display unit and the value input device and having a processor and a memory operatively coupled to the processor. The controller was programmed to control the overall functions of the gaming machine, including generating game displays representing one or more of a number of casino games, such as poker, blackjack, slots, keno or bingo.

U.S. Pat. No. 6,149,522 to Alcorn, et al. discloses a gaming apparatus of the type described above. The Alcorn, et al. patent also discloses the preparation of gaming data which includes subjecting the gaming data to a hash function to generate a message digest and the subsequently encrypting of the message digest using an encryption key to form an encrypted message digest. Gaming data is authenticated by the gaming apparatus by decrypting the encrypted message digest and then comparing that unencrypted message digest with a hash of the original gaming data. U.S. Pat. No. 5,759,102 to Pease, et al. discloses a method and apparatus for downloading information to a plurality of gaming terminals from a central computer.

SUMMARY OF THE INVENTION

In one aspect, the invention is directed to a gaming system that may include a gaming security arbiter, a first network gaming device and a second network gaming device. The gaming security arbiter may include an arbiter controller that may include a processor and a memory operatively coupled to the processor of the arbiter controller. The arbiter controller may be programmed to receive a request from a first network gaming device, to provide a first encryption key to the first network gaming device and to provide a second encryption key to the second network gaming device. The request may include a request for a communication session between the first network gaming device and the second network gaming device. The first network gaming device may be operatively coupled to the gaming security arbiter and may include a first controller which may include a processor and a memory operatively coupled to the processor of the first controller. The first controller may be programmed to transmit a request to the gaming security arbiter for a communication session with the second network gaming device, to receive the first encryption key from the gaming security arbiter, to encrypt a message with the first encryption key and to transmit the message to the second network gaming device. The second network gaming device may be operatively coupled to the first network gaming device and the gaming security arbiter. The second network gaming device may include a second controller, which may include a processor and a memory operatively coupled to the processor of the second controller. The second controller may be programmed to receive the second encryption key from the gaming security arbiter, to receive the encrypted message from the first network gaming device and to decrypt the encrypted message using the second encryption key.

In another aspect, the invention is directed to a gaming apparatus which may include a display unit, a value input device and a controller operatively coupled to the display unit and the value input device, the controller comprising a processor and a memory operatively coupled to the processor. The controller may be programmed to cause the display unit to generate a game display, to receive a first encryption key from a gaming security arbiter, to encrypt a first message with the first encryption key, to transmit the first encrypted message to a first network gaming device and to determine a value payout associated with an outcome of the game. The game display may relate to one of the following games: poker, blackjack, slots, keno or bingo.

In a further aspect, the invention is directed to a gaming security arbiter operatively coupled to a first network gaming device and a second network gaming device. The gaming security arbiter may include a controller which may include a processor and a memory operatively coupled to the processor. The controller may be programmed to receive a request from the first network gaming device, to provide a first encryption key to the first network gaming device, to provide verification of the authenticity of the first network gaming device to the second network gaming device, and to provide a second encryption key to the second network gaming device. The request may include a request for a communication session between the first network gaming device and the second network gaming device.

In yet another aspect, the invention is directed to a gaming security method performed by a gaming security arbiter. The gaming security method may include receiving a request at the gaming security arbiter from a first network gaming device for a communication session between the first network gaming device and a second network gaming device, providing a first encryption key from the gaming security arbiter to the first network gaming device, providing verification of the authenticity of the first network gaming device to the second network gaming device, and providing a second encryption key from the gaming security arbiter to the second network gaming device.

Additional aspects of the invention are defined by the claims of this patent.

BRIEF DESCRIPTION OF THE DRAWINGS

FIG. 3 is a block diagram of the electronic components of the gaming unit of FIG. 2;

FIG. 19 is a flowchart of an embodiment of a video bingo routine that may be performed by one or more of the gaming units.

DETAILED DESCRIPTION OF VARIOUS EMBODIMENTS

Although the following text sets forth a detailed description of numerous different embodiments of the invention, it should be understood that the legal scope of the invention is defined by the words of the claims set forth at the end of this patent. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
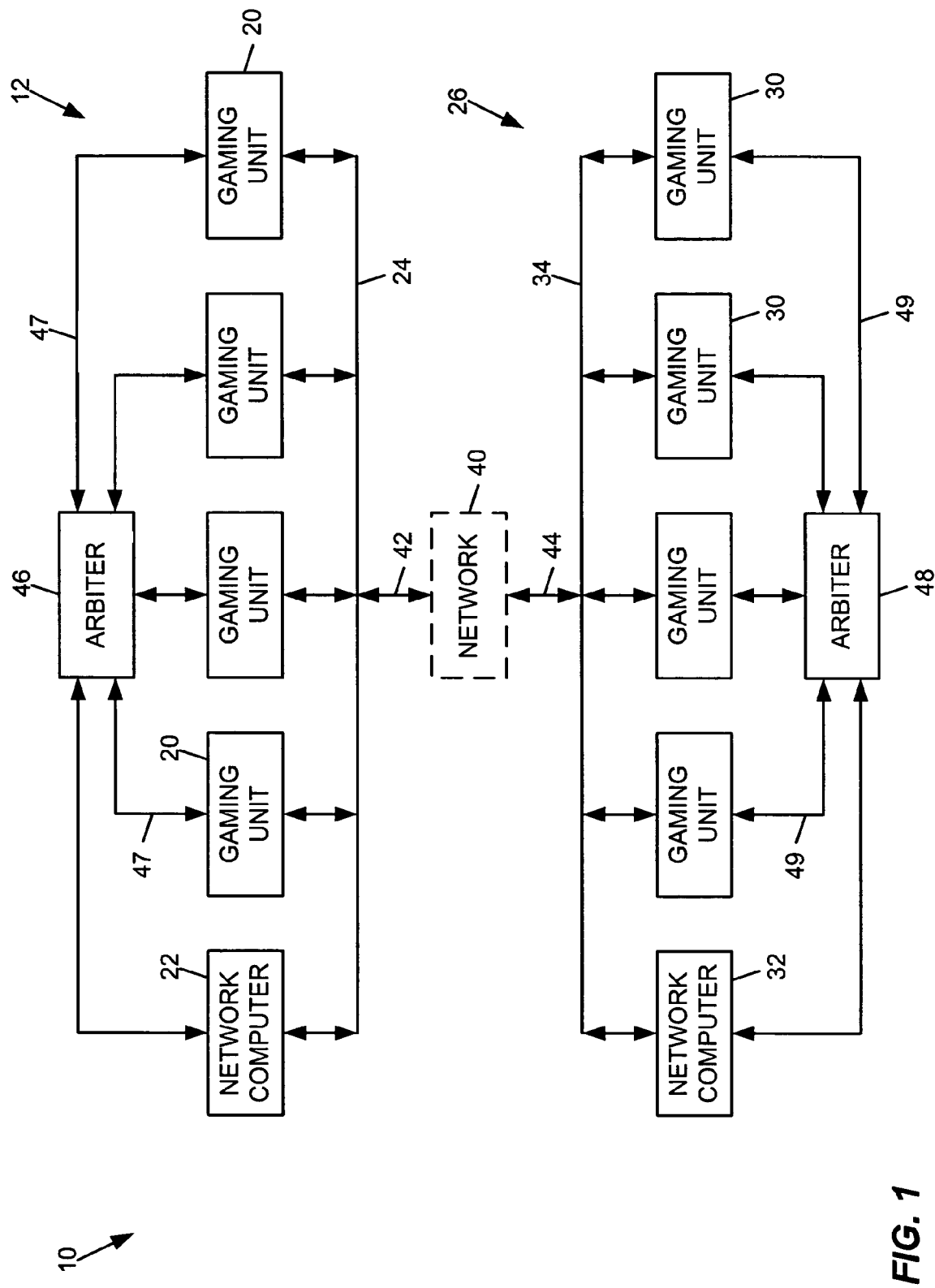
FIG. 1 is a block diagram of an embodiment of a gaming system in accordance with the invention.

FIG. 1 illustrates one possible embodiment of a casino gaming system 10 in accordance with the invention. Referring to FIG. 1, the casino gaming system 10 may include a first group or network 12 of casino gaming units 20 operatively coupled to a network computer 22 via a network data link or bus 24. The casino gaming system 10 may include a second group or network 26 of casino gaming units 30 operatively coupled to a network computer 32 via a network data link or bus 34. The first and second gaming networks 12, 26 may be operatively coupled to each other via a network 40, which may comprise, for example, the Internet, a wide area network (WAN), or a local area network (LAN) via a first network link 42 and a second network link 44. The gaming units 20 and network computer 26 of the first gaming network 12 may be operatively coupled to an authentication agent or gaming security arbiter 46 via a network data link or bus 47 for secure communications among the gaming units 20 and the network computer 22. Likewise, the gaming units 30 and network computer 32 of the second gaming network 26 may be operatively coupled to a second authentication agent or gaming security arbiter 48 via a network data link or bus 49 for secure communications among the gaming units 30 and the network computer 32. Each network computer 22, 32 and gaming unit 20, 30 may also use the gaming security arbiters 46, 48 for secure communications across the network 40.

The first network 12 of gaming units 20 may be provided in a first casino, and the second network 26 of gaming units 30 may be provided in a second casino located in a separate geographic location than the first casino. For example, the two casinos may be located in different areas of the same city, or they may be located in different states. The network 40 may include a plurality of network computers or server computers (not shown), each of which may be operatively interconnected. Where the network 40 comprises the Internet, data communication may take place over the communication links 42, 44 via an Internet communication protocol.

The network computer 22 may be a server computer and may be used to accumulate and analyze data relating to the operation of the gaming units 20. For example, the network computer 22 may continuously receive data from each of the gaming units 20 indicative of the dollar amount and number of wagers being made on each of the gaming units 20, data indicative of how much each of the gaming units 20 is paying out in winnings, data regarding the identity and gaming habits of players playing each of the gaming units 20, etc. The network computer 32 may be a server computer and may be used to perform the same or different functions in relation to the gaming units 30 as the network computer 22 described above.

Although each network 12, 26 is shown to include one network computer 22, 32, four gaming units 20, 30 and one gaming security arbiter 46, 48, it should be understood that different numbers of computers, gaming security arbiters and gaming units may be utilized. For example, the network 12 may include a plurality of network computers 22, gaming security arbiters 46 and tens or hundreds of gaming units 20, all of which may be interconnected via the data links 24, 47. The data links 24, 47 may be provided as dedicated hardwired links or wireless links. Although the data links 24, 47 are shown as single data links 24, 47, the data links 24, 47 may comprise multiple data links.

Figure 2:
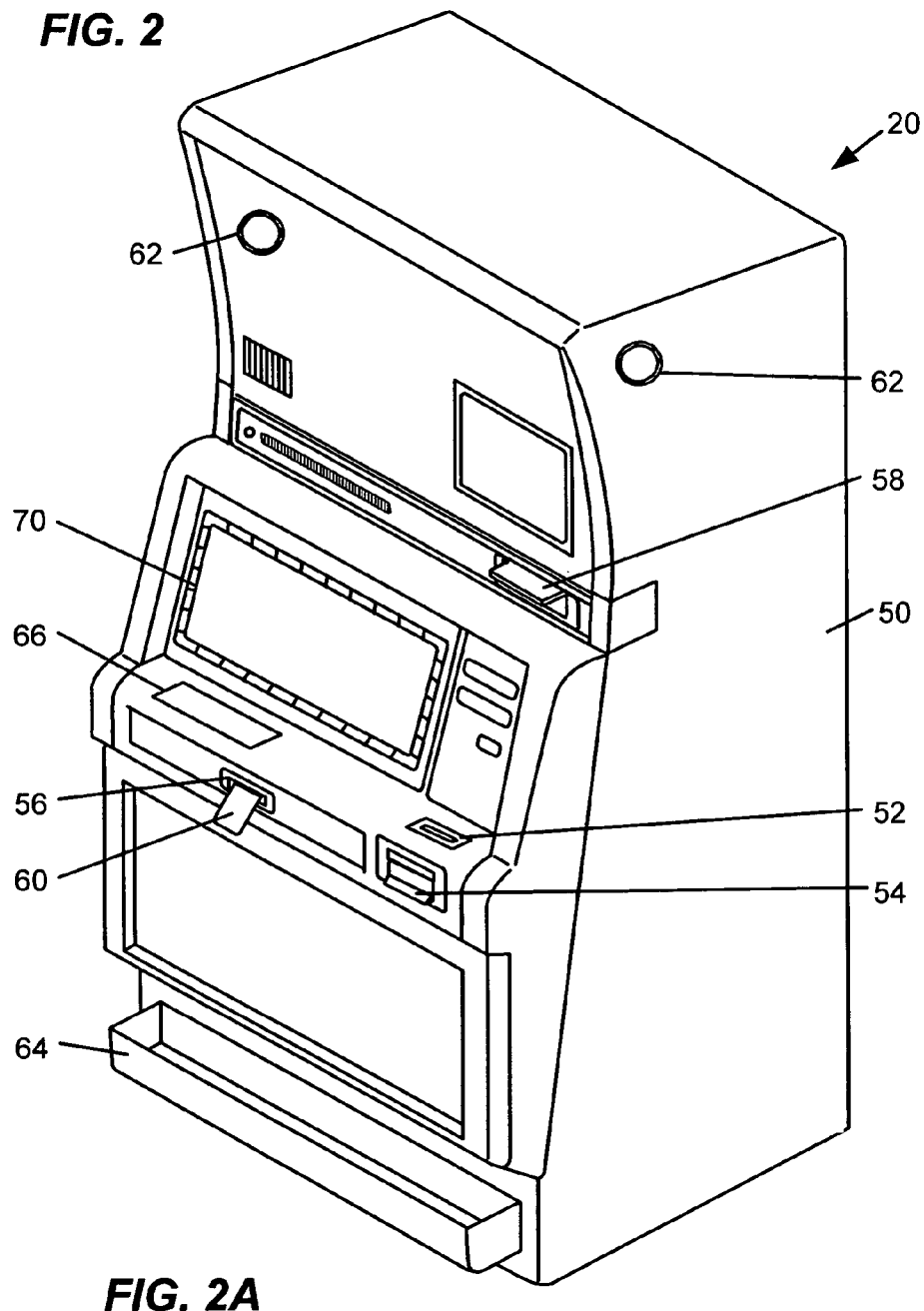
FIG. 2 is a perspective view of an embodiment of one of the gaming units shown schematically in FIG. 1.

FIG. 2 is a perspective view of one possible embodiment of one or more of the gaming units 20. Although the following description addresses the design of the gaming units 20, it should be understood that the gaming units 30 may have the same design as the gaming units 20 described below. It should be understood that the design of one or more of the gaming units 20 may be different than the design of other gaming units 20, and that the design of one or more of the gaming units 30 may be different than the design of other gaming units 30. Each gaming unit 20 may be any type of casino gaming unit and may have various different structures and methods of operation. For exemplary purposes, various designs of the gaming units 20 are described below, but it should be understood that numerous other designs may be utilized.

Referring to FIG. 2, the casino gaming unit 20 may include a housing or cabinet 50 and one or more input devices, which may include a coin slot or acceptor 52, a paper currency acceptor 54, a ticket reader/printer 56 and a card reader 58, which may be used to input value to the gaming unit 20. A value input device may include any device that can accept value from a customer. As used herein, the term "value" may encompass gaming tokens, coins, paper currency, ticket vouchers, credit or debit cards, smart cards, and any other object representative of value.

If provided on the gaming unit 20, the ticket reader/printer 56 may be used to read and/or print or otherwise encode ticket vouchers 60. The ticket vouchers 60 may be composed of paper or another printable or encodable material and may have one or more of the following informational items printed or encoded thereon: the casino name, the type of ticket voucher, a validation number, a bar code with control and/or security data, the date and time of issuance of the ticket voucher, redemption instructions and restrictions, a description of an award, and any other information that may be necessary or desirable. Different types of ticket vouchers 60 could be used, such as bonus ticket vouchers, cash-redemption ticket vouchers, casino chip ticket vouchers, extra game play ticket vouchers, merchandise ticket vouchers, restaurant ticket vouchers, show ticket vouchers, etc. The ticket vouchers 60 could be printed with an optically readable material such as ink, or data on the ticket vouchers 60 could be magnetically encoded. The ticket reader/printer 56 may be provided with the ability to both read and print ticket vouchers 60, or it may be provided with the ability to only read or only print or encode ticket vouchers 60. In the latter case, for example, some of the gaming units 20 may have ticket printers 56 that may be used to print ticket vouchers 60, which could then be used by a player in other gaming units 20 that have ticket readers 56.

If provided, the card reader 58 may include any type of card reading device, such as a magnetic card reader or an optical card reader, and may be used to read data from a card offered by a player, such as a credit card or a player tracking card. If provided for player tracking purposes, the card reader 58 may be used to read data from, and/or write data to, player tracking cards that are capable of storing data representing the identity of a player, the identity of a casino, the player's gaming habits, etc.

The gaming unit 20 may include one or more audio speakers 62, a coin payout tray 64, an input control panel 66, and a display unit 70. Where the gaming unit 20 is designed to facilitate play of a video casino game, such as video poker or video slots, the display unit 70 may be a color video display unit that displays images relating to the particular game or games. Where the gaming unit 20 is designed to facilitate play of a reel-type slot machine, the display unit 70 may comprise a plurality of mechanical reels that are rotatable, with each of the reels having a plurality of reel images disposed thereon. The audio speakers 62 may generate audio representing sounds such as the noise of spinning slot machine reels, a dealer's voice, music, announcements or any other audio related to a casino game. The input control panel 66 may be provided with a plurality of pushbuttons or touch-sensitive areas that may be pressed by a player to select games, make wagers, make gaming decisions, etc.

Figure 2A:
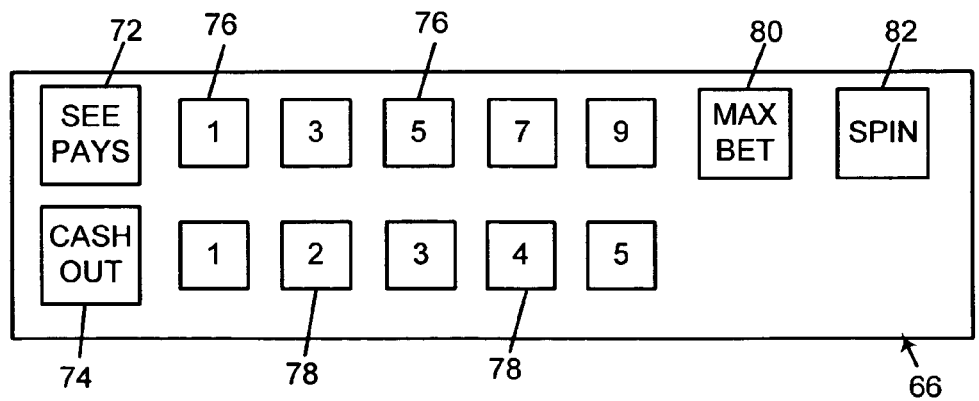
FIG. 2A illustrates an embodiment of a control panel for a gaming unit.

FIG. 2A illustrates one possible embodiment of the control panel 66, which may be used where the gaming unit 20 is a slot machine having a plurality of mechanical or "virtual" reels. Referring to FIG. 2A, if the display unit 70 is provided in the form of a video display unit, the control panel 66 may include a "See Pays" button 72 that, when activated, causes the display unit 70 to generate one or more display screens showing the odds or payout information for the game or games provided by the gaming unit 20. As used herein, the term "button" is intended to encompass any device that allows a player to make an input, such as an input device that must be depressed to make an input selection or a display area that a player may simply touch. The control panel 66 may include a "Cash Out" button 74 that may be activated when a player decides to terminate play on the gaming unit 20, in which case the gaming unit 20 may return value to the player, such as by returning a number of coins to the player via the payout tray 64.

If the gaming unit 20 provides a slots game having a plurality of reels and a plurality of paylines which define winning combinations of reel symbols, the control panel 66 may be provided with a plurality of selection buttons 76, each of which allows the player to select a different number of paylines prior to spinning the reels. For example, five buttons 76 may be provided, each of which may allow a player to select one, three, five, seven or nine paylines.

If the gaming unit 20 provides a slots game having a plurality of reels, the control panel 66 may be provided with a plurality of selection buttons 78 each of which allows a player to specify a wager amount for each payline selected. For example, if the smallest wager accepted by the gaming unit 20 is a quarter ($0.25), the gaming unit 20 may be provided with five selection buttons 78, each of which may allow a player to select one, two, three, four or five quarters to wager for each payline selected. In that case, if a player were to activate the "5" button 76 (meaning that five paylines were to be played on the next spin of the reels) and then activate the "3" button 78 (meaning that three coins per payline were to be wagered), the total wager would be $3.75 (assuming the minimum bet was $0.25).

The control panel 66 may include a "Max Bet" button 80 to allow a player to make the maximum wager allowable for a game. In the above example, where up to nine paylines were provided and up to five quarters could be wagered for each payline selected, the maximum wager would be 45 quarters, or $11.25. The control panel 66 may include a spin button 82 to allow the player to initiate spinning of the reels of a slots game after a wager has been made.

In FIG. 2A, a rectangle is shown around the buttons 72, 74, 76, 78, 80, 82. It should be understood that that rectangle simply designates, for ease of reference, an area in which the buttons 72, 74, 76, 78, 80, 82 may be located. Consequently, the term "control panel" should not be construed to imply that a panel or plate separate from the housing 50 of the gaming unit 20 is required, and the term "control panel" may encompass a plurality or grouping of player activatable buttons.

Although one possible control panel 66 is described above, it should be understood that different buttons could be utilized in the control panel 66, and that the particular buttons used may depend on the game or games that could be played on the gaming unit 20. If the display unit 70 is provided as a video display unit, the control panel 66 could be generated by the display unit 70. In that case, each of the buttons of the control panel 66 could be a colored area generated by the display unit 70, and some type of mechanism may be associated with the display unit 70 to detect when each of the buttons was touched, such as a touch-sensitive screen.

Gaming Unit Electronics

FIG. 3 is a block diagram of a number of components that may be incorporated in the gaming unit 20. Referring to FIG. 3, the gaming unit 20 may include a controller 100 that may comprise a program memory 102, a microcontroller or microprocessor (MP) 104, a random-access memory (RAM) 106 and an input/output (I/O) circuit 108, all of which may be interconnected via an address/data bus 110. It should be appreciated that although only one microprocessor 104 is shown, the controller 100 may include multiple microprocessors 104. Similarly, the memory of the controller 100 may include multiple RAMs 106 and multiple program memories 102. Although the I/O circuit 108 is shown as a single block, it should be appreciated that the I/O circuit 108 may include a number of different types of I/O circuits. The RAM(s) 104 and program memories 102 may be implemented as semiconductor memories, magnetically readable memories, and/or optically readable memories, for example.

Although the program memory 102 is shown in FIG. 3 as a read-only memory (ROM) 102, the program memory of the controller 100 may be a read/write or alterable memory, such as a hard disk. In the event a hard disk is used as a program memory, the address/data bus 110 shown schematically in FIG. 3 may comprise multiple address/data buses, which may be of different types, and there may be an I/O circuit disposed between the address/data buses.

FIG. 3 illustrates that the control panel 66, the coin acceptor 52, the bill acceptor 54, the card reader 58 and the ticket reader/printer 56 may be operatively coupled to the I/O circuit 108, each of those components being so coupled by either a unidirectional or bidirectional, single-line or multiple-line data link, which may depend on the design of the component that is used. The speaker(s) 62 may be operatively coupled to a sound circuit 112, that may comprise a voice- and sound-synthesis circuit or that may comprise a driver circuit. The sound-generating circuit 112 may be coupled to the I/O circuit 108.

As shown in FIG. 3, the components 52, 54, 56, 58, 66, 112 may be connected to the I/O circuit 108 via a respective direct line or conductor. Different connection schemes could be used. For example, one or more of the components shown in FIG. 3 may be connected to the I/O circuit 108 via a common bus or other data link that is shared by a number of components. Furthermore, some of the components may be directly connected to the microprocessor 104 without passing through the I/O circuit 108.

Gaming System Security

Figure 4:
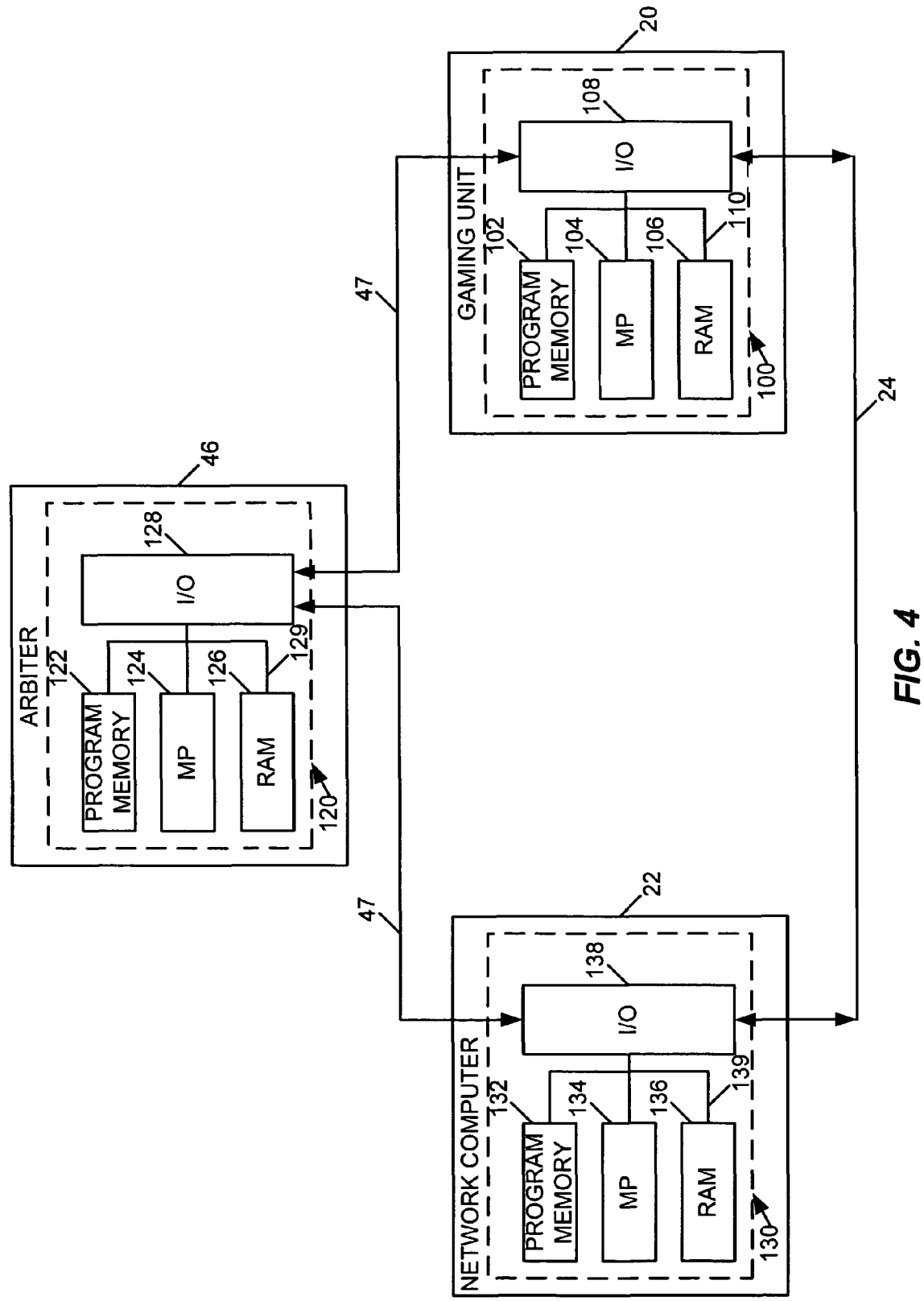
FIG. 4 is a block diagram of an embodiment of a communication topology a gaming security arbiter and two or more communication devices.

FIG. 4 is a block diagram of a communication topology between a gaming unit 20, the network computer 22 and the gaming security arbiter 46. Although only one gaming unit 20, one network computer 22 and one gaming security arbiter 46 are shown in FIG. 4, it should be understood that the following examples may be applicable to different types of network gaming devices within the gaming network 12 beyond the gaming unit 20 and the network computer 22, and may include different numbers of network computers, gaming security arbiters and gaming units. For example, a single gaming security arbiter 46 may be used for secure communications among a plurality of network computers 22 and tens, hundreds or thousands of gaming units 20. Likewise, multiple gaming security arbiters 46 may be utilized for improved performance and other scalability factors.

Referring to FIG. 4, the gaming security arbiter 46 may include an arbiter controller 120 that may comprise a program memory 122, a microcontroller or microprocessor (MP) 124, a random-access memory (RAM) 126 and an input/output (I/O) circuit 128, all of which may be interconnected via an address/data bus 129. The network computer 22 may also include a controller 130 that may comprise a program memory 132, a microcontroller or microprocessor (MP) 134, a random-access memory (RAM) 136 and an input/output (I/O) circuit 138, all of which may be interconnected via an address/data bus 139. It should be appreciated that although the gaming security arbiter 46 and the network computer 22 are each shown with only one microprocessor 124, 134, the controllers 120, 130 may each include multiple microprocessors 124, 134. Similarly, the memory of the controllers 120, 130 may include multiple RAMs 126, 136 and multiple program memories 122, 132. Although the I/O circuits 128, 138 are each shown as a single block, it should be appreciated that the I/O circuits 128, 138 may include a number of different types of I/O circuits. The RAMs 124, 134 and program memories 122, 132 may be implemented as semiconductor memories, magnetically readable memories, and/or optically readable memories, for example.

Although the program memories 122, 132 are shown in FIG. 4 as read-only memories (ROM) 122, 132, the program memories of the controllers 120, 130 may be a read/write or alterable memory, such as a hard disk. In the event a hard disk is used as a program memory, the address/data buses 129, 139 shown schematically in FIG. 4 may each comprise multiple address/data buses, which may be of different types, and there may be an I/O circuit disposed between the address/data buses.

As shown in FIG. 4, the gaming unit 20 may be operatively coupled to the network computer 22 via the data link 24. The gaming unit 20 may also be operatively coupled to the gaming security arbiter 46 via the data link 47, and the network computer 22 may likewise be operatively coupled to the gaming security arbiter 46 via the data link 47. Communications between the gaming unit 20 and the network computer 22 may involve different information types of varying levels of sensitivity resulting in varying levels of encryption techniques depending on the sensitivity of the information. For example, communications such as drink orders and statistical information may be considered less sensitive. A drink order or statistical information may remain encrypted, although with moderately secure encryption techniques, such as RC4, resulting in less processing power and less time for encryption. On the other hand, financial information (e.g., account information, winnings, etc.) and personal information (e.g., social security number, personal preferences, etc.) may be encrypted with stronger encryption techniques such as DES or 3DES to provide increased security.

As will be disclosed in further detail below, the gaming security arbiter 46 may verify the authenticity of each network gaming device. The gaming security arbiter 46 may receive a request for a communication session from a network device. For ease of explanation, the requesting network device may be referred to as the client, and the requested network device may be referred to as the host. The client may be any device on the network 12 and the request may be for a communication session with any other network device. The client may specify the host, or the gaming security arbiter may select the host based on the request and based on information about the client and potential hosts. The gaming security arbiter 46 may provide encryption keys (session keys) for the communication session to the client via the secure communication channel. Either the host and/or the session key may be provided in response to the request, or may have been previously provided. The client may contact the host to initiate the communication session. The host may then contact the gaming security arbiter 46 to determine the authenticity of the client. The gaming security arbiter 46 may provide affirmation (or lack thereof) of the authenticity of the client to the host and provide a corresponding session key, in response to which the network devices may initiate the communication session directly with each other using the session keys to encrypt and decrypt messages.

Alternatively, as will be disclosed in further detail below, upon receiving a request for a communication session, the gaming security arbiter 46 may contact the host regarding the request and provide corresponding session keys to both the client and the host. The gaming security arbiter 46 may then initiate either the client or the host to begin their communication session. In turn, the client and host may begin the communication session directly with each other using the session keys to encrypt and decrypt messages. An additional explanation of the communication request, communication response and key distribution is provided below.

Figure 5:
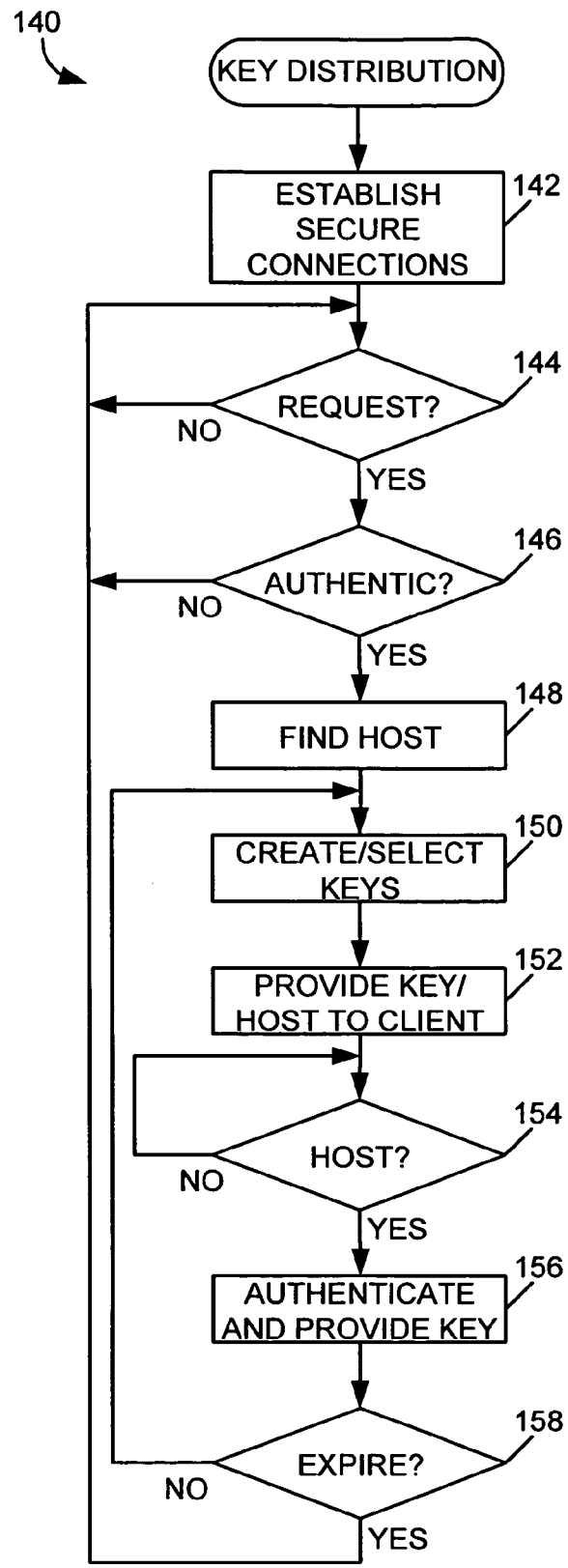
FIG. 5 is a flowchart of an embodiment of a key distribution routine that may be performed by the gaming security arbiter.

FIG. 5 is a flowchart of a key distribution routine 140 that may be stored in the memory of the arbiter controller 120. Referring to FIG. 5, the key distribution routine 140 may begin operation at block 142 during which the gaming security arbiter 46 establishes secure communication channel connections with each of the gaming units 20, network computers 22, or other devices connected to the network 12 via the data links 47. The secure communication channel may include a secure socket layer (SSL) connection or an Internet Protocol Security (IPSec) connection, for example. As part of establishing the secure communication channels, the gaming security arbiter 46 may receive a user datagram protocol (UDP) message from a network device requesting the network location of the gaming security arbiter 46. The gaming security arbiter 46 may respond to the network device with a UDP message that includes the Internet Protocol (IP) address of the gaming security arbiter 46.

The gaming security arbiter 46 may further verify the authenticity of the network device by exchanging certificates at block 142. The authentication process may be used to verify the identity of the network device and verify that the network device is authorized to communicate over the network 12 with other network devices. The certificates may be predetermined by the network administrator or other authorized personnel, and may be provided to each network device when configuring the network device to be connected to the network 12. The certificate exchange may include an exchange of encryption keys, which may be asymmetric public encryption keys from public-private key pairs such as pretty good privacy (PGP) encryption keys, for subsequent communications between the network device and the gaming security arbiter 46. In another example, the asymmetric encryption key pairs may be used to share symmetric encryption keys that may be used for subsequent communications.

In some cases, an authentic network device may nonetheless be denied communications with other network devices. Such decisions may be an override function made by an operator, such as a network administrator, casino operator or other authorized personnel, and may be for a variety of reasons, including, but not limited to, legal and regulatory reasons. The gaming security arbiter 46 may therefore communicatively disconnect the network device from the network in response to an operator input to prevent the device from communicating with other devices on the network. In addition, restrictions may be established regarding how the network device may communicate. For example, a network device may only be allowed to communicate with a particular group of network devices and/or may be prohibited from communicating with other network devices. The gaming security arbiter 46 may establish a list of approved network devices and/or a list of unapproved network devices. The list(s) may be associated with a network device to prevent the network device from communicating with other network devices that are either not on the approved list and/or network devices that are on the unapproved list.

In addition to authentication, the network device may inform the gaming security arbiter 46 of the services, resources and capabilities of the network device. For example, the network device may inform the gaming security arbiter 46 of capabilities, such as supported encryption methods (e.g., RC4, DES, 3DES), supported compression methods (e.g., zlib, bzip2) and supported data formats (e.g., XML, HTTP, raw binary). Additional services or resources that may be offered may include gaming routines, financial information, player tracking information, etc. The network device may further inform the gaming security arbiter 46 of what gaming functions may be supported by the network device based on its resources, services and capabilities. Alternatively, the gaming security arbiter 46 may determine what gaming functions may be supported by the network device based on its resources, services and capabilities. That is, the gaming security arbiter 46 may maintain data that associates a gaming function with particular resources, services and/or capabilities relating to that gaming function, such that the gaming security arbiter 46 may receive data regarding a gaming function and determine the resources, services and/or capabilities used to support that gaming function, or vice versa. Gaming functions may include, but are not limited to, accounting, configuring a gaming unit 20 for a particular player, auditing, and maintenance, for example.

Although encryption keys for communication sessions may be distributed to the communicating network devices in response to a request, as disclosed in further detail below, encryption keys may also be provided to a network device in response to verifying its authenticity. For example, an authenticated network device may be provided with a plurality of encryption keys for subsequent communication sessions. The network device selects an appropriate encryption key based on the communication (e.g., communication type, security level, encryption capabilities, etc.).

Common keys may also be distributed once the secure communication channel has been established for broadcast or multicast communications. A common session key may be designed for broadcast or multicast communications, such as when the network computer 22 may transmit information, such as a gaming routine update, to all gaming units 20, or other instances where information is shared among multiple devices. The common session keys may also be used by the gaming security arbiter 46 to communicate with two or more network devices. In yet another example, the common session keys may be used for UDP communications. The common session keys may therefore be distributed to all gaming units 20, network computers 22, etc. that have been authenticated by the gaming security arbiter 46. This may occur either upon request of the transmitting device (e.g., the network computer 22) or automatically when a network device connects to the network 12 and completes the authentication process with the gaming security arbiter 46.

The secure communication channel and authentication may provide mutual authentication between the gaming security arbiter 46 and each network gaming device, such as between the gaming security arbiter 46 and the gaming unit 20, and between the gaming security arbiter 46 and the network computer 22. For example, when a network computer 22 connects to the network 12, the network computer 22 may establish a secure connection with the gaming security arbiter 46 and inform the gaming security arbiter 46 of its resources, services and capabilities. The network computer 22 and the gaming security arbiter 46 may exchange certificates to verify each other's identity and establish mutual authentication. As a result, each network computer 22 may establish a secure connection and mutual trust with the gaming security arbiter 46. Subsequent communications between the gaming security arbiter 46 and the network computer 22 may be encrypted using the encryption keys. The gaming security arbiter 46 and the gaming unit 20 may also perform the authentication process and encryption key exchange such that every gaming unit 20 may establish a secure connection and mutual trust with the gaming security arbiter 46. As a result, the gaming unit 20 may establish an indirect, mutual trust with the network computer 22 because both the gaming unit 20 and the network computer 22 established a mutual trust with the gaming security arbiter 46. A similar indirect, mutual trust may be established with any other gaming unit 20, network computer 22, or other devices that have established a direct mutual trust with the gaming security arbiter 46.

Having established a secure communication channel with each device on the network, and having authenticated each network device to verify its identity and authority to communicate over the network 12, the gaming security arbiter 46 may wait until it receives a request for a communication session from a network device at block 144. In response to the request, the gaming security arbiter 46 may provide the client with one or more available hosts and/or one or more encryption keys for the communication session, as disclosed in further detail below. In some cases, the request may accompany or immediately follow the connection of a network device at block 142. It is also noted that, in some cases, a request for a communication session may result in an adequate host not being immediately available. This may be for a variety of reasons, including incompatible services, resources or capabilities of existing hosts. However, if an adequate host becomes available and establishes a secure connection with the gaming security arbiter 46, as at block 142, the gaming security arbiter 46 may provide the newly connected host with a list of one or more clients for the host to connect to following block 142.

The request may relate to a communication session between a gaming unit 20 and one or more network computers 22, between gaming units 22 for peer-to-peer communications, between network computers 22, etc. Although the request may specify a particular host, the request relate to request for a host having a particular service, resource or capability. In one example, the request may inform the gaming security arbiter of a gaming function to be performed by the client. In order to complete the gaming function, the client may require the resources, services and/or capabilities of one or more hosts. By informing the gaming security arbiter 46 of the gaming function, the gaming security arbiter 46 may select one or more hosts that provide the resources, services and/or capabilities required by the gaming function.

The request may also include a request for one or more particular pairs of session keys, a request for a particular security level, information regarding the communication type and information regarding the client's capabilities (e.g., supported encryption, compression, data formats), for example. The gaming security arbiter 46 may use this information to specify a compatible host. In yet another example, the request may inform the network security arbiter 46 of services or resources that the client may provide along with a request to connect the client to any host that requires those services.

The gaming security arbiter 46 may verify that the client has been authenticated at block 146. If authenticated, as determined at block 146, the gaming security arbiter 46 may search among a list of authenticated network devices for a host to fulfill the request at block 148. The gaming security arbiter 46 may select a host that is most suitable for the client based on the request. For example, if the request includes a request for a communication session with a particular host, and the gaming security arbiter 46 may determine if the host is connected to the network 12 and determine if the host is an authenticated network device. If the request includes a request for a particular service, resource and/or capability, the gaming security arbiter 46 may select a host that fulfills the requested service, resource and/or capability based on information provided by a host when it informs the gaming security arbiter 46 of resources, services and capabilities that the host provides. A request regarding a client gaming function may also result in the gaming security arbiter 46 selecting a host that may provide a service, resource or capability to fulfill the gaming function.

In yet another example, if the client provides particular services, resources or capabilities and requests a host in need of those services, resources or capabilities, the network security arbiter 46 may select a host that may require the provided service, resource or capability. The gaming security arbiter 46 may further select a host based on the capabilities of the client based on information previously received from the client, such as at block 142. For example, if the client only supports an XML data format, the gaming security arbiter 46 may search for a host capable of the XML data format at block 148, as opposed to a host capable of only HTTP and/or raw data formats. The gaming security arbiter 46 may thereby negotiate a communication session between a host and a client based on the capabilities of each, in addition to taking into account the services and resources offered and/or requested by the client and host. The network security arbiter 46 may also select a host that may require the services, resources or capabilities offered by the client for to fulfill a gaming function to be performed by the host. The gaming security arbiter 46 may search for hosts that may require such resources, services and/or capabilities upon establishing a secure communication channel at block 142 and based on previous requests for services, resources or capabilities, as noted above.

It should be understood that more than one host may fulfill the request and the gaming security arbiter 46 may provide a list of multiple hosts to the client. The client may subsequently select a host(s) from the list and connect to one or more of the provided hosts. Alternatively, if more than one host is available to fulfill a request, the gaming security arbiter 46 may choose a host at block 148 based on load balancing considerations, to ensure that the load is as balanced as practicable across the network 12. If existing hosts are incompatible with the request (e.g., incompatible services, resources or capabilities), the gaming security arbiter 46 may refuse to permit the client to communication with the host, even if the host is specifically requested by the client. Instead, the gaming security arbiter 46 may select an alternative host, or wait for a suitable host to connect to the network 12 at block 142 and provide the client with the identity of the newly connected host. On the other hand, even if an existing host is compatible, the network security arbiter 46 may prevent the client and host from communicating if the host is not on a list of approved network devices for the client or if the host is on a list of unapproved network devices for the client. Likewise, the network security arbiter 46 may prevent the communication session if the client is not included in a list of approved network devices for the host or if the client is included in a list of unapproved network devices for the host.

The gaming security arbiter 46 may create a set of session keys at block 150 in response to the request, either based on a client request for a specific encryption key or based on additional information provided in the request. Alternatively, the session keys may have been previously created, and the gaming security arbiter 46 may retrieve session keys in response to the request at block 150. The session keys may be either symmetric or asymmetric encryption keys. Although the gaming security arbiter 46 may create or select a session key based on the client request, in other instances the host may determine the particular session key to use. For example, the client may request a communication session with the host to download a new game. The host may determine (or have predetermined) that gaming code information is very sensitive. The host may therefore request a session key having a high encryption level.

The particulars of the session keys may depend on the security level for the communication, the communication type and/or the capabilities of the client and host. For example, if the request related to less sensitive information, such as a drink order or statistical information, or if the request specified a low security level, the gaming security arbiter 46 may create/select a session key having a moderately secure encryption technique, such as RC4. For more sensitive information, such as financial information, or if the request specified a high security level, a session key pair relating to a highly secure encryption technique, such as 3DES, may be created/selected. The session keys may be further determined according to the type of communication involved in transmitting the message. For example, a broadcast, multicast or UDP communication session may result in a common session key being created/selected. On the other hand, the session keys may be specific session keys which are only distributed to a particular client and host. The specific session keys may further be valid only for particular communication sessions, and discarded by the gaming unit 20 and network computer 22 when the communication session is ended. The session keys may further depend on the encryption capabilities of the client and/or the host, and the gaming security arbiter 46 may create/select a session key pair compatible with the client and host.

Generally, the session key may be associated with a serial number or other identification, to inform the decrypting device which encryption algorithm was used to encrypt the information. For example, a host may simultaneously communicate with multiple clients using both common and specific session keys, or a communication session may involve multiple messages. In either case, the information may include varying levels of sensitivity, resulting in varying encryption schemes. The gaming security arbiter 46 may create/select multiple pairs of session keys to accommodate multiple levels of security, and each session key may be associated with a serial number or other identification. The client or host may determine sensitivity of the information in a message and thus determine the appropriate key on a message-by-message basis depending on the level of security required, as disclosed in further detail below. The gaming security arbiter 46 may further include a timestamp on the session key indicating the date/time of creation, distribution and/or expiration. In addition or alternatively, the gaming security arbiter 46 may maintain data on when the session keys were created and/or distributed, and when the session key may expire.

In addition to creating or selecting the appropriate session keys at block 150, the gaming security arbiter 46 may also determine appropriate communication parameters, such as encryption methods, authentication, compression methods, communication channels and data formats, to be used by the client and host. The determination of compression and data formats may be based on compatible capabilities between the client and the potential host. For example, the gaming security arbiter 46 may determine that the client and host will communicate using an XML data format because that is a compatible data format for each. The gaming security arbiter 46 may further may establish communication parameters that specify the compression technique to use based on the size of a message. For instance, the communication parameters may dictate that messages under 100 bytes are to be left uncompressed, messages between 100-500 bytes are to be compressed using zlib and messages over 500 bytes are to be compressed using bzip2. Encryption methods may be specified by the gaming security arbiter 46 based on sensitivity or network security, for example. Communication channels may be specified by the gaming security arbiter 46 based on load balancing considerations, channel security or information sensitivity. Likewise, authentication techniques may be specified by the gaming security arbiter 46 based on sensitivity and security. While any of these communication parameters (e.g., encryption, authentication, compression, communication channel, data format, etc.) may be determined by the client and/or host, it is therefore also possible for the gaming security arbiter 46 to dictate the parameters of the communication session between the client and the host.

At block 152, in response to the request, the gaming security arbiter 46 may distribute one or more session keys and/or host identification (e.g., IP address) of one or more hosts to the client, along with the communication parameters, if applicable. In one example, the gaming security arbiter 46 may distribute a session key to the client and confirm receipt of the session key(s). If the gaming security arbiter 46 provides multiple session keys and/or multiple hosts, the client may select a session key(s) or host(s) from the lists and proceed with the communication session accordingly. The session keys and/or host identification may be encrypted using the encryption keys previously exchanged between the gaming security arbiter 46 and the client during authentication. In addition to host identification, the gaming security arbiter 46 may also provide information about the host, including, but not limited to, services, resources and capabilities provided by the host, and gaming functions supported by the host.

Although the gaming security arbiter 46 may distribute the session keys and/or host identification in response to a specific request, it should be understood that the session keys may have also been previously provided to the client and host in response to the authentication verification at block 142, in which case the gaming security arbiter 46 may provide the selected host to the client, and the client and host may communicate using existing session keys.

Having distributed the session key(s) and host(s) identification to the client, the gaming security arbiter 46 may wait for a communication from the host at block 154. The communication from the host may inform the gaming security arbiter 46 that the client is attempting to initiate a communication session with the host. The host communication may therefore include request for confirmation from the gaming security arbiter 46 that the client is an authenticated network device and that the gaming security arbiter 46 authorized the client to communicate with the host. The arbiter may provide such confirmation at block 156 and further provide a session key(s) to the host corresponding to the session key(s) provided to the client at block 152. The session keys may be encrypted using the encryption keys exchanged with the host during authentication verification. Alternatively, the session key(s) may have been previously provided to the host during the authentication verification. Additionally, the gaming security arbiter 46 may inform the host of the client's capabilities, services and/or resources, and/or inform the host of the communication parameters of the communication session between the client and the host. The client and host may then commence the communication session using the session keys to encrypt/decrypt messages, and based on the communication parameters and capabilities, if provided by the gaming security arbiter 46.

As mentioned above, the session keys may include a timestamp indicating the time/date of creation, distribution and/or expiration, or the gaming security arbiter 46 may otherwise note the same. At block 158, the gaming security arbiter 46 may determine whether a predetermined amount of time has elapsed since the session keys were created or distributed. In other words, the gaming security arbiter 46 may determine whether the session keys have expired or are about to expire. If not, the gaming security arbiter 46 may continue to wait. Otherwise, control may pass to block 150 and the gaming security arbiter 46 may renegotiate new session keys for the client and host, either automatically or upon request from the client or host. Alternatively, the client or host may determine if the session keys have expired, or are about to expire, and request the gaming security arbiter 46 to negotiate new session keys. The client and host may further utilize different keys upon expiration, if multiple session keys were initially provided. If new session keys are not negotiated, the existing session keys may expire, and the communication session may be terminated.

Figure 5A:
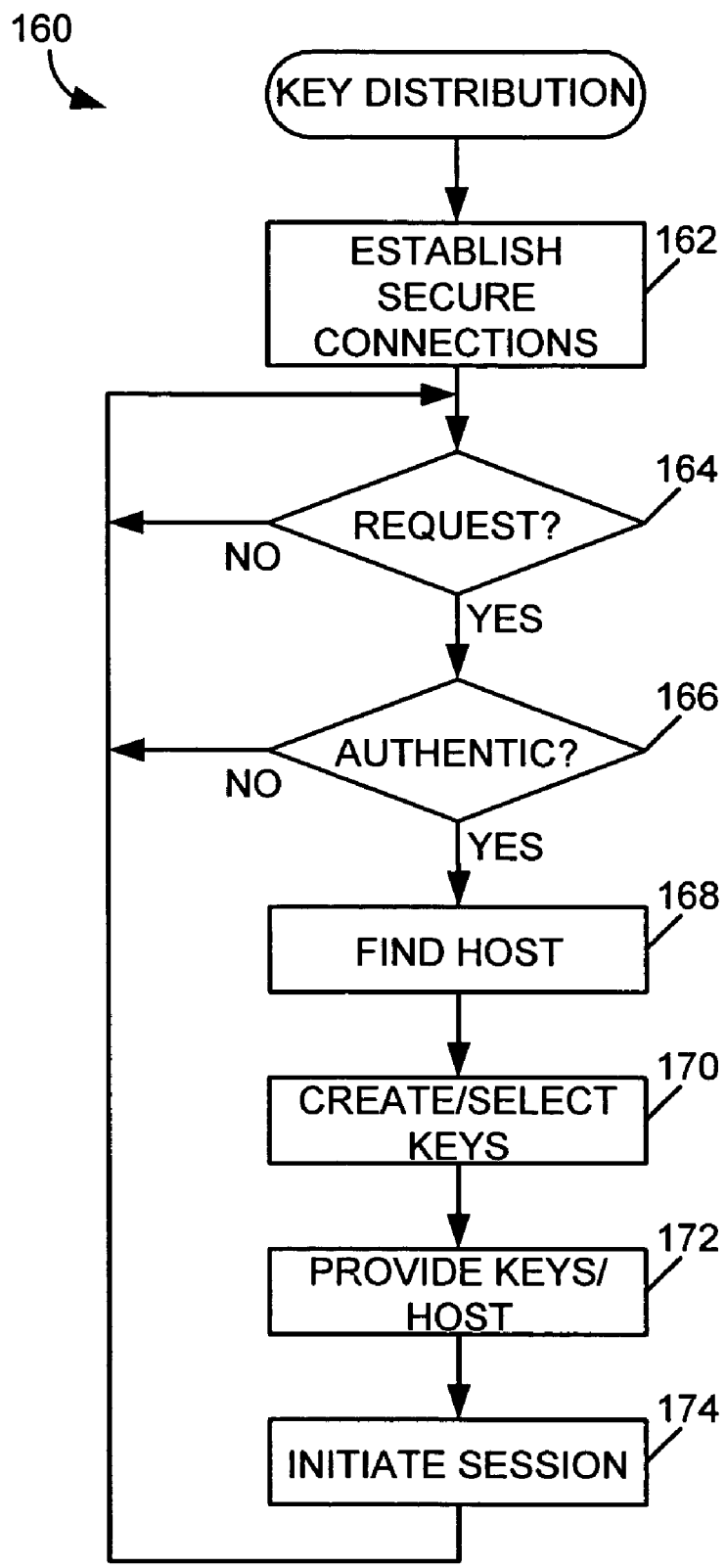
FIG. 5A is a flowchart of an alternative embodiment of a key distribution routine that may be performed by the gaming security arbiter.

FIG. 5A is a flowchart of an alternative key distribution routine 160 that may be stored in the memory of the arbiter controller 120. Referring to FIG. 5A, the key distribution routine 160 may begin operation at block 162 during which the gaming security arbiter 46 establishes secure communication channel connections, such as SSL or IPSec, with each of the gaming units 20, network computers 22, or other devices connected to the network 12. The connecting network device may transmit a UDP message, and the gaming security arbiter 46 may respond to the message with its IP address. The gaming security arbiter 46 may verify the authenticity of the network device by exchanging certificates and encryption keys for further communications between the gaming security arbiter 46 and the network device. The gaming security arbiter 46 may thereby authenticate each device on the network to verify its identity and authority to communicate over the network 12. Override functions may also be initiated by an operator to communicative disconnect the network device from the from the network. Approved and unapproved network device lists may be established for the network device, and the gaming security arbiter 46 may determine if the network device is to be listed on any approved or unapproved network device lists. The network device may further inform the gaming security arbiter 46 of the services, resources, capabilities and supported gaming functions of the network device, or the gaming security arbiter 46 may determine what gaming functions the network device may support. Common and/or specific session keys may also be distributed, or the session keys may be distributed in response to a request.

The gaming security arbiter 46 may wait until it receives a request from a client at block 164, which may be any one of the network devices. Alternatively, the gaming security arbiter 46 may automatically proceed to negotiate a communication session based on a previously existing request or a request from a newly authenticated network device. The request may include a request for a particular host or for a host offering particular services, resources or capabilities (e.g., encryption, compression, data format), or inform the gaming security arbiter 46 of a gaming function to be performed by the client. The request may also include a request for a host that requires the services, resources or capabilities of the client. The request may further specify a request for particular session keys, a particular security level, the communication type or information about the client's capabilities, for example.

The gaming security arbiter 46 may verify that the client has been authenticated at block 166. At block 168, the gaming security arbiter 46 may search among a list of authenticated network devices to determine if a requested host is connected to the network 12 and authenticated. If a request does not specify a particular host, the gaming security arbiter 46 may one or more host that may fulfill the details of the request and/or is compatible with the client. The gaming security arbiter 46 may therefore select a host based on services, resources, capabilities offered by the host that are compatible with the services, resources and capabilities required by the client or a gaming function to be performed by the client. Alternatively, if the client provides particular services, resources or capabilities and requests a host in need of those services, resources or capabilities, the network security arbiter 46 may search for compatible hosts. If more than one host fulfills the request, the gaming security arbiter 46 may create a list of multiple hosts for the client to choose from or select a host based on load balancing considerations. The gaming security arbiter 46 may also restrict a client from communicating with a host (e.g., based on approved and unapproved lists) and provide the client with an alternative host.

The gaming security arbiter 46 may create or select a set of session keys at block 170 in response to, and appropriate for, the request. As mentioned, the session keys may be specified in the request by the client, or the gaming security arbiter 46 may create or select the appropriate session keys based on the request (e.g., capabilities, security level, communication type, etc.) or by having the requested device specify the session keys. Multiple sets of session keys of varying types of encryption may be created or selected, such that the client or host may determine the appropriate session key for a message, which may be based on communication parameters established by the gaming security arbiter 46. If the request relates to a multicast communication, a broadcast communication, a UDP communication, etc., a common session key may result, whereas if the request relates to a direct communication between two devices, the gaming security arbiter 46 may create/select specific session keys.

Each session key pair may include an identification to allow the client and host to encrypt and decrypt messages using the appropriate session key. The gaming security arbiter 46 may further include a timestamp on the session key indicating the date/time of creation, distribution and/or expiration, or otherwise note when the session keys were created and/or distributed, and when the session key may expire. The gaming security arbiter 46 may further determine appropriate the encryption methods, authentication, compression methods, communication channels and/or data formats to be used by the client and host, which may be based on compatible capabilities between the client and the potential host. The gaming security arbiter 46 may specify the encryption methods, authentication, compression methods, communication channels and data formats in the communication parameters.

At block 172, the gaming security arbiter 46 may inform the client of the host(s) it may communicate with along with information about the host (e.g., services, resources, capabilities, supported gaming functions, etc.), and inform the host that an authorized client wishes to communicate with the host. The gaming security arbiter 46 may further distribute the session keys to the client and to the host, along with the communication parameters and/or capabilities, if applicable. As above, although the gaming security arbiter 46 may distribute the session keys and/or host identification in response to a specific request, it should be understood that the session keys may have also been previously provided to the client and host in response to the authentication verification, in which case the gaming security arbiter 46 may provide the selected host to the client, and the client and host may communicate using existing session keys. The session keys may be encrypted using the encryption keys exchanged during the authentication verification. In one example, the gaming security arbiter 46 may first distribute a session key to the host and confirm receipt before distributing a session key to the client and confirming receipt of the session key to the client. If the session keys are successfully received, the gaming security arbiter 46 may inform the client that the session keys were successfully received, and at block 174 the gaming security arbiter 46 may prompt the client to initiate the communication session with the host, or prompt the host to communicate with the client. If the session keys are not delivered successfully, the gaming security arbiter 46 may resend the session keys. The client and host may then commence the communication session using the session keys to encrypt/decrypt messages, and based on the communication parameters and capabilities, if provided by the gaming security arbiter 46. New session keys may be renegotiated automatically or upon a request from the client or host.

Figure 6:
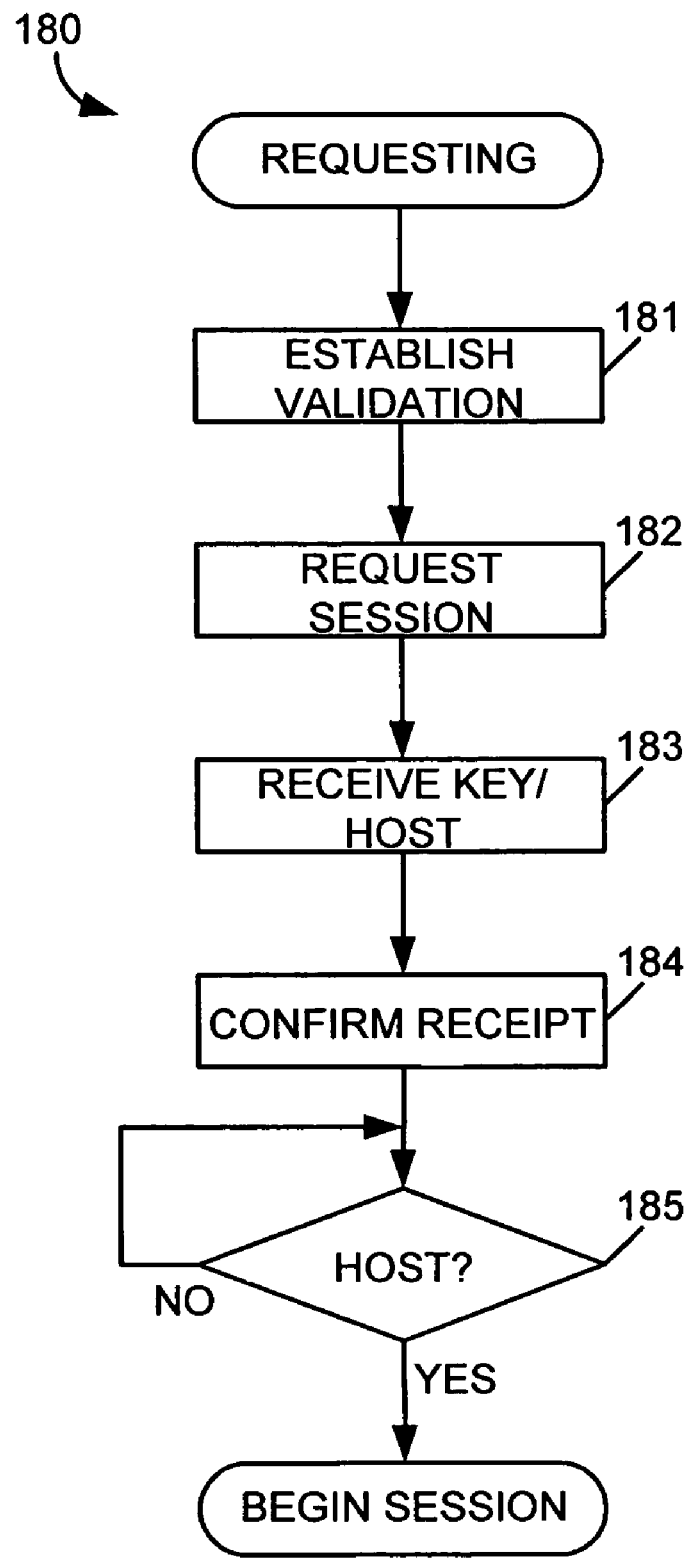
FIG. 6 is a flowchart of an embodiment of a communication request routine that may be performed by a device requesting a communication session.

FIG. 6 is a flowchart of a communication request routine 180 that may be stored in the memory of the controller of a network device requesting a communication session (client), such as the controller 100 of the gaming unit 20, the controller 130 of the network computer 22, etc. Referring to FIG. 6, the communication request routine 180 may begin at block 181 during which the client may with establish a secure communication channel connection, such as an SSL or IPSec connection, with the gaming security arbiter 46. Upon connecting to the network 12, the client may determine its IP address (e.g., through dynamic host configuration protocol) and broadcast a UDP message, to which the gaming security arbiter 46 may respond with its own IP address. As part of establishing a secure communication channel connection, the client may authenticate itself for the gaming security arbiter 46, and may further authenticate the gaming security arbiter 46, by exchanging certificates and encryption keys for further communications. The client may receive a common encryption key for multicast or broadcast communications, and specific session keys may also be received. The client may further inform the arbiter of services, resources, capabilities and gaming functions provided by the client.

Having established a secure communication channel and authentication with the gaming security arbiter 46, the client may request a communication session with one or more devices on the network 12 (host) at block 182. Alternatively, the client may request a particular service or resource, or specify a gaming function, in response to which the gaming security arbiter 46 may decide which host will provide the service or resource. The request may relate to resources, service and capabilities offered by the client, and request a host(s) that may require such resources, services and capabilities. The request may also include a request for a particular security level, a request for one or more particular pairs of session keys, communication type, or any other information that may be used by the gaming security arbiter 46 to provide the appropriate session keys. In yet another example, the gaming security arbiter 46 may automatically provide the client with a host(s) to communication with upon authentication at block 181.

In response to the request, and assuming the gaming security arbiter 46 approves the request, the client may receive the session key(s) at block 183 and confirm receipt of the session key(s) with the gaming security arbiter 46 at block 184. The client may receive an identification of the host(s) and communication parameters as determined by the gaming security arbiter 46. In one example, the session key(s) was received after authentication verification, which the client may use when provided with the host identification. Multiple session keys and/or multiple hosts may result in the client selecting an appropriate session key or host for the communication session. The client then initiate the communication session directly with the host, and wait for the host to respond at block 185. As mentioned above, the host will contact the gaming security arbiter 46 to confirm the client's authenticity. If authenticated, the client may receive a message from the host and commence the communication session in accordance with the communication parameters, if applicable. Otherwise, the client may continue to wait for contact from the host, and/or after a predetermined amount of time, attempt to renegotiate the communication session with the gaming security arbiter 46. Alternatively, the gaming security arbiter 46 may provide the client and host with authorization to initiate the communication session, rather than have the client and the host contact the gaming security arbiter 46 for confirmation.

All messages may be communicated directly between the client and the host, without routing the message through the gaming security arbiter 46. If one of the network devices engaged in a communication session is transmitting a message, the transmitting device may encrypt the information with a session key appropriate for the sensitivity of the information, as determined by the gaming security arbiter 46, the client or the host. The transmitting device may also include routing information and session key identification, so the receiving device may verify it is the correct recipient and use the appropriate session key to decrypt the message. Additional information, such as compression and data format, for example, may be included in the message header to permit appropriate (de)compression and formatting/reading. The message header may be encrypted using a predetermined encryption key or may remain unencrypted. The receiving device may read the message header, including routing information, session key identification, etc., and decrypt the message using the appropriate session key. The message header information may remain unencrypted. The session keys may include an expiration and may automatically expire, causing the client and host to renegotiate further session keys with the gaming security arbiter 46, or otherwise receive further session keys from the gaming security arbiter 46, if the communication session is to continue. Alternatively, the client and host may utilize a new session key already provided by the gaming security arbiter 46, if multiple session keys were provided.

Figure 7:
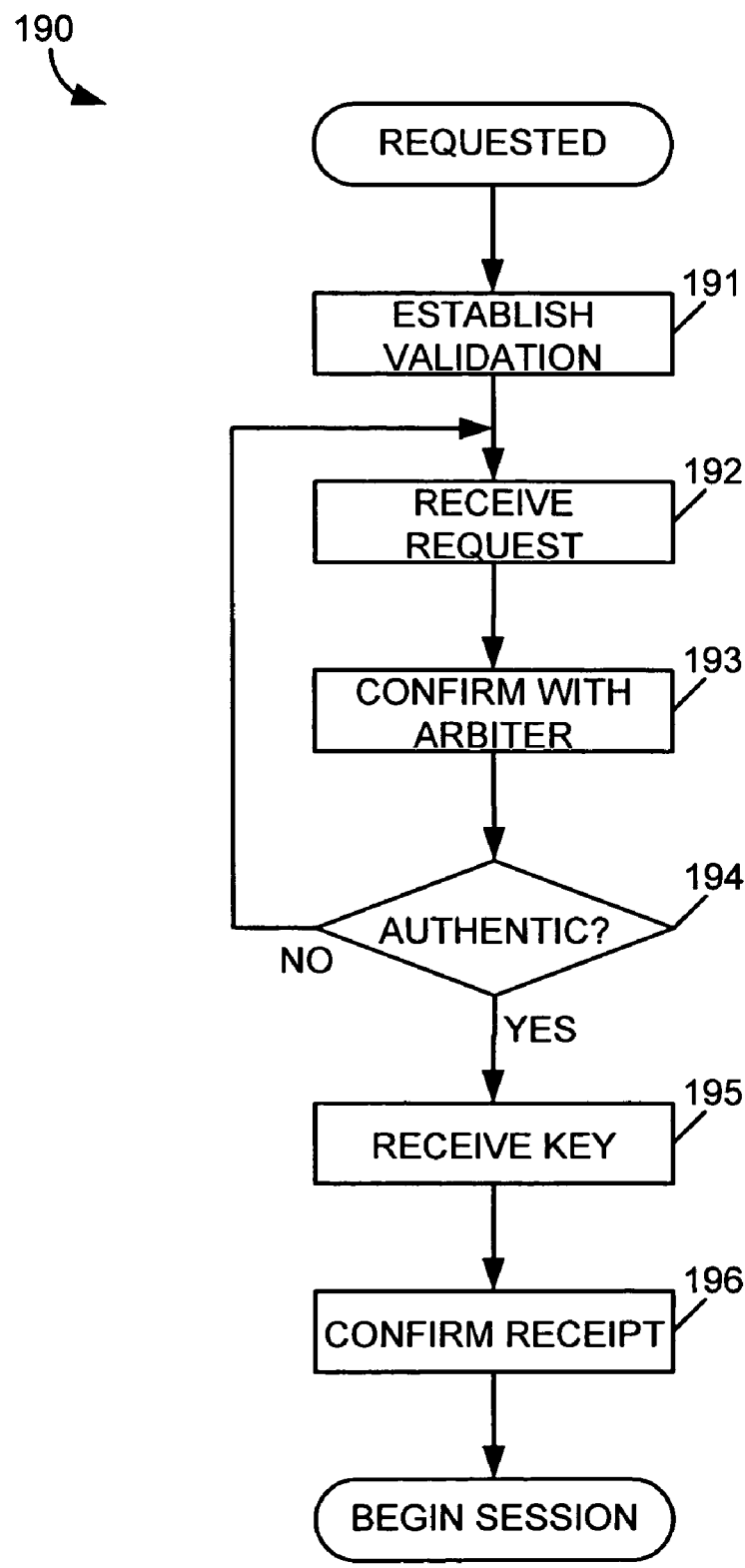
FIG. 7 is a flowchart of an embodiment of a routine for responding to a communication request that may be performed by a device that has been requested for a communication session.

FIG. 7 is a flowchart of a communication request response routine 190 that may be stored in the memory of the controller of a host being contacted by a client for a communication session, such as the controller 100 of the gaming unit 20, the controller 130 of the network computer 22, etc. Referring to FIG. 7, the communication request response routine 190 may begin at block 192 during which the host may establish contract with the gaming security arbiter 46 and establish a secure communication channel connection, such as an SSL or IPSec connection, with the gaming security arbiter 46. Upon connecting to the network 12, the host may determine its IP address (e.g., through dynamic host configuration protocol) and broadcast a UDP message, to which the gaming security arbiter 46 may respond with its own IP address. As part of establishing a secure communication channel connection, the host may exchange certificates and encryption keys with the gaming security arbiter 46. The host may further inform the gaming security arbiter 46 of resources, service, capabilities and gaming functions supported by the host, or required by the host. The host may receive a common encryption key for multicast or broadcast communications, and/or specific session keys for subsequent communication sessions.

Having established a secure communication channel and authentication with the gaming security arbiter 46, the host may receive a request for a communication session from a client at block 192. The request may inform the host of the details of the request (e.g., the service, resource, capabilities, communication parameters, security level, communication type, etc.). In yet another example, the gaming security arbiter 46 may automatically provide the host with a client(s) to communicate with upon authentication at block 191

The host may request confirmation of the client's authenticity from the gaming security arbiter 46 at block 193. At block 194, the host may wait for the gaming security arbiter 46 to provide confirmation of the client's authenticity. If provided, the host may receive the session keys from the gaming security arbiter 46 at block 195, along with communication parameters, client services, resources, capabilities, etc., if applicable. If confirmation is not provided, the host may refuse to communicate with the client. Alternatively, the gaming security arbiter 46 may provide the client and host with authorization to initiate the communication session, rather than have the client and the host contact the gaming security arbiter 46 for confirmation.

The host may receive the session key(s), communication parameters, etc. from the gaming security arbiter 46 at block 195 and confirm receipt of the session keys at block 196. The host may then initiate the communication session directly with the client. The host may encrypt the information with the appropriate session key if transmitting information, and decrypt information with the appropriate session key if receiving information. Routing information and session key identification may also be included in the message headers, to verify the correct recipient received the message and to use the appropriate session key to encrypt or decrypt the message. Additional information, such as compression and data format, for example, may be included in the message header, which may be encrypted or may remain unencrypted. The session keys may automatically expire, causing the client and host to receive further session keys from the gaming security arbiter 46 or utilize a new session key already provided by the gaming security arbiter 46.

Overall Operation of Gaming Unit

One manner in which one or more of the gaming units 20 (and one or more of the gaming units 30) may operate is described below in connection with a number of flowcharts which represent a number of portions or routines of one or more computer programs, which may be stored in one or more of the memories of the controller 100. The computer program(s) or portions thereof may be stored remotely, outside of the gaming unit 20, and may control the operation of the gaming unit 20 from a remote location. Such remote control may be facilitated with the use of a wireless connection, or by an Internet interface that connects the gaming unit 20 with a remote computer (such as one of the network computers 22, 32) having a memory in which the computer program portions are stored. The computer program portions may be written in any high level language such as C, C++, C#, Java or the like or any low-level assembly or machine language. By storing the computer program portions therein, various portions of the memories 102, 106 are physically and/or structurally configured in accordance with computer program instructions.

Figure 8:
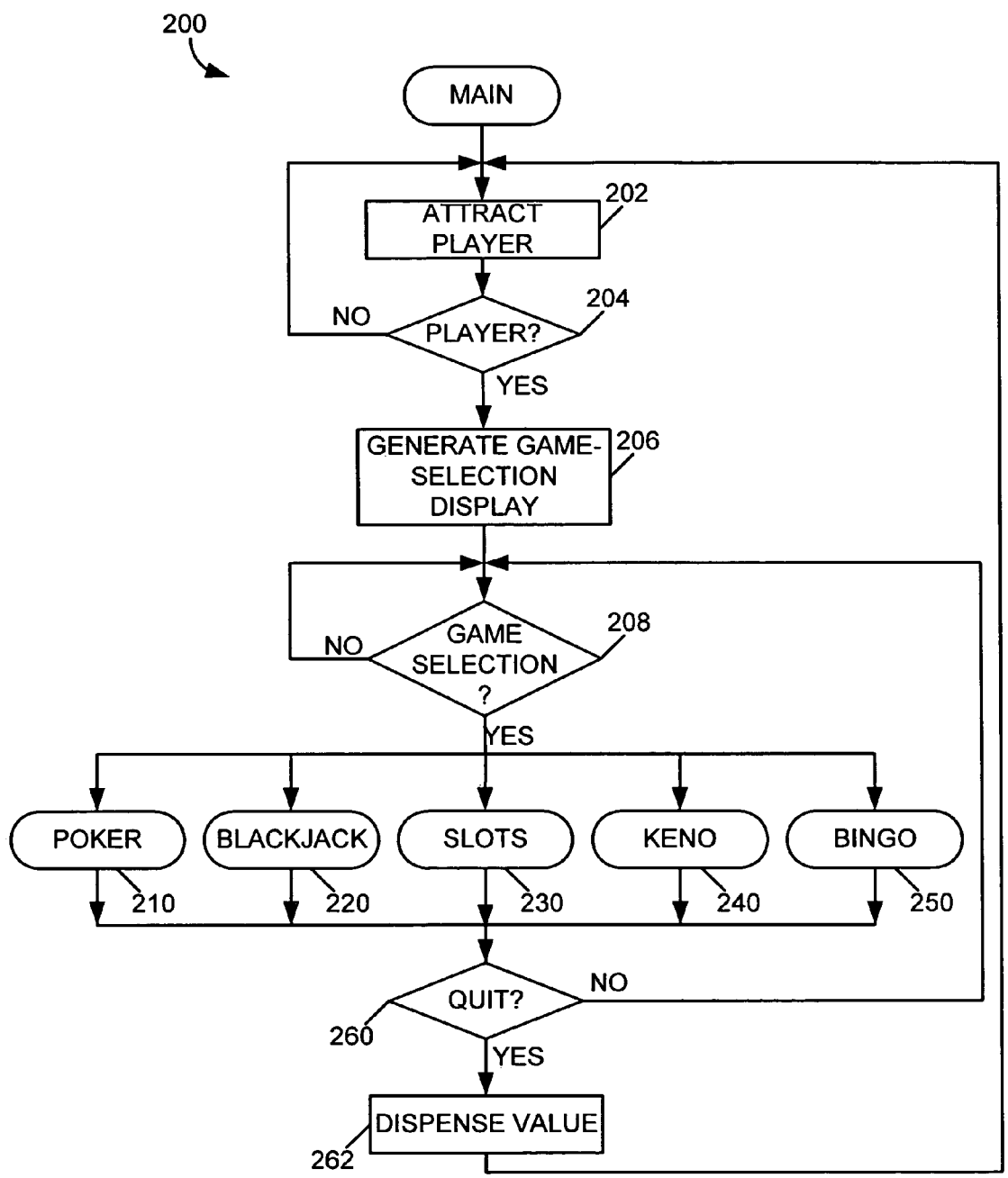
FIG. 8 is a flowchart of an embodiment of a main routine that may be performed during operation of one or more of the gaming units.

FIG. 8 is a flowchart of a main operating routine 200 that may be stored in the memory of the controller 100. Referring to FIG. 8, the main routine 200 may begin operation at block 202 during which an attraction sequence may be performed in an attempt to induce a potential player in a casino to play the gaming unit 20. The attraction sequence may be performed by displaying one or more video images on the display unit 70 (if provided as a video display unit) and/or causing one or more sound segments, such as voice or music, to be generated via the speakers 62. The attraction sequence may include a scrolling list of games that may be played on the gaming unit 20 and/or video images of various games being played, such as video poker, video blackjack, video slots, video keno, video bingo, etc.

During performance of the attraction sequence, if a potential player makes any input to the gaming unit 20 as determined at block 204, the attraction sequence may be terminated and a game-selection display may be generated on the display unit 70 (if provided as a video display unit) at block 206 to allow the player to select a game available on the gaming unit 20. The gaming unit 20 may detect an input at block 204 in various ways. For example, the gaming unit 20 could detect if the player presses any button on the gaming unit 20; the gaming unit 20 could determine if the player deposited one or more coins into the gaming unit 20; the gaming unit 20 could determine if player deposited paper currency into the gaming unit; etc.

The game-selection display generated at block 206 may include, for example, a list of video games that may be played on the gaming unit 20 and/or a visual message to prompt the player to deposit value into the gaming unit 20. While the game-selection display is generated, the gaming unit 20 may wait for the player to make a game selection. Upon selection of one of the games by the player as determined at block 208, the controller 100 may cause one of a number of game routines to be performed to allow the selected game to be played. For example, the game routines could include a video poker routine 210, a video blackjack routine 220, a slots routine 230, a video keno routine 240, and a video bingo routine 250. At block 208, if no game selection is made within a given period of time, the operation may branch back to block 202.

After one of the routines 210, 220, 230, 240, 250 has been performed to allow the player to play one of the games, block 260 may be utilized to determine whether the player wishes to terminate play on the gaming unit 20 or to select another game. If the player wishes to stop playing the gaming unit 20, which wish may be expressed, for example, by selecting a "Cash Out" button, the controller 100 may dispense value to the player at block 262 based on the outcome of the game(s)

played by the player. The operation may then return to block 202. If the player did not wish to quit as determined at block 260, the routine may return to block 208 where the game-selection display may again be generated to allow the player to select another game.

It should be noted that although five gaming routines are shown in FIG. 8, a different number of routines could be included to allow play of a different number of games. The gaming unit 20 may also be programmed to allow play of different games.

Figure 9:
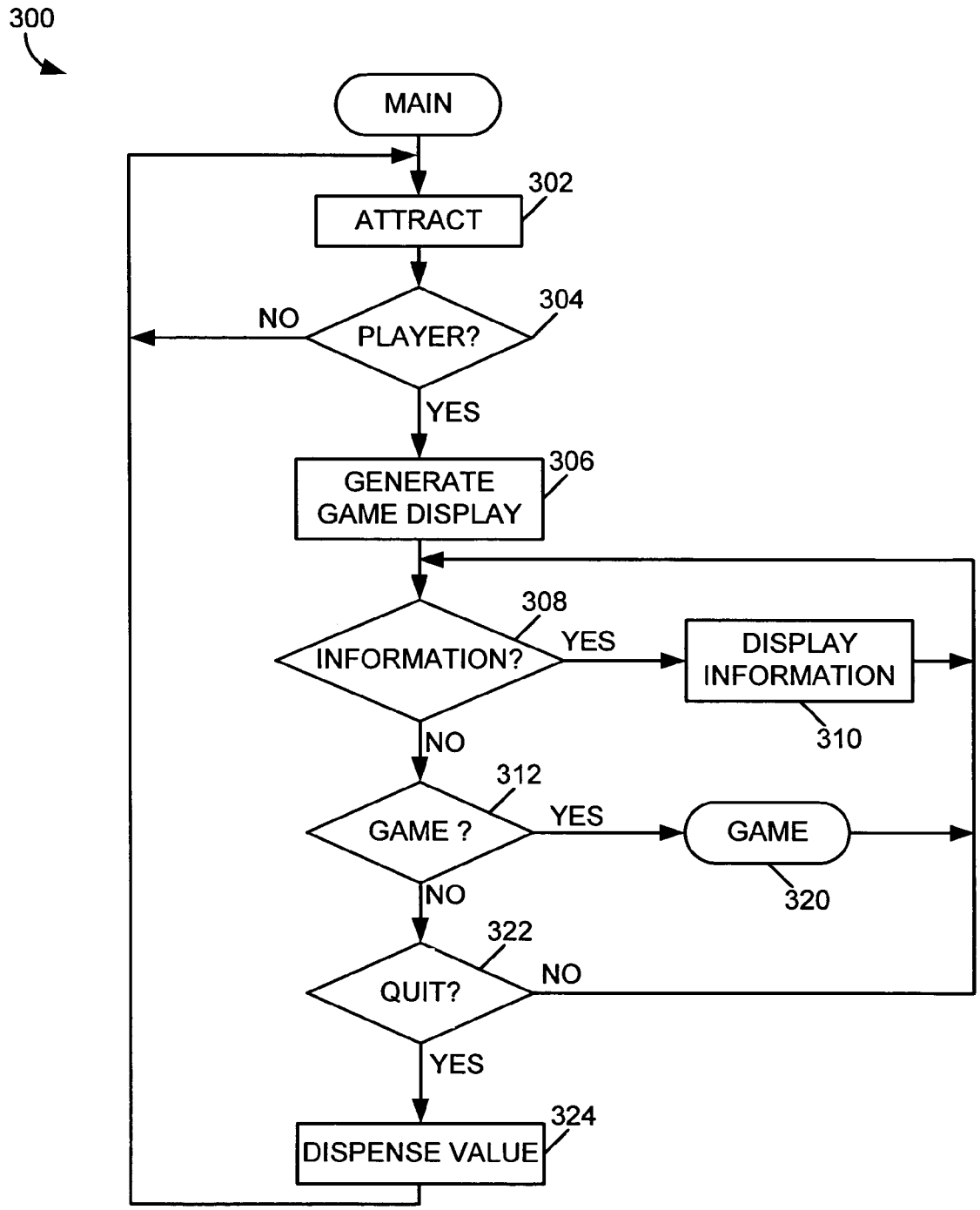
FIG. 9 is a flowchart of an alternative embodiment of a main routine that may be performed during operation of one or more of the gaming units.

FIG. 9 is a flowchart of an alternative main operating routine 300 that may be stored in the memory of the controller 100. The main routine 300 may be utilized for gaming units 20 that are designed to allow play of only a single game or single type of game. Referring to FIG. 9, the main routine 300 may begin operation at block 302 during which an attraction sequence may be performed in an attempt to induce a potential player in a casino to play the gaming unit 20. The attraction sequence may be performed by displaying one or more video images on the display unit 70 (if provided as a video display unit) and/or causing one or more sound segments, such as voice or music, to be generated via the speakers 62.

During performance of the attraction sequence, if a potential player makes any input to the gaming unit 20 as determined at block 304, the attraction sequence may be terminated and a game display may be generated on the display unit 70 (if provided as a video display unit) at block 306. The game display generated at block 306 may include, for example, an image of the casino game that may be played on the gaming unit 20 and/or a visual message to prompt the player to deposit value into the gaming unit 20. At block 308, the gaming unit 20 may determine if the player requested information concerning the game, in which case the requested information may be displayed at block 310. Block 312 may be used to determine if the player requested initiation of a game, in which case a game routine 320 may be performed. The game routine 320 could be any one of the game routines disclosed herein, such as one of the five game routines 210, 220, 230, 240, 250, or another game routine.

After the routine 320 has been performed to allow the player to play the game, block 322 may be utilized to determine whether the player wishes to terminate play on the gaming unit 20. If the player wishes to stop playing the gaming unit 20, which wish may be expressed, for example, by selecting a "Cash Out" button, the controller 100 may dispense value to the player at block 324 based on the outcome of the game(s) played by the player. The operation may then return to block 302. If the player did not wish to quit as determined at block 322, the operation may return to block 308.

Figure 10:
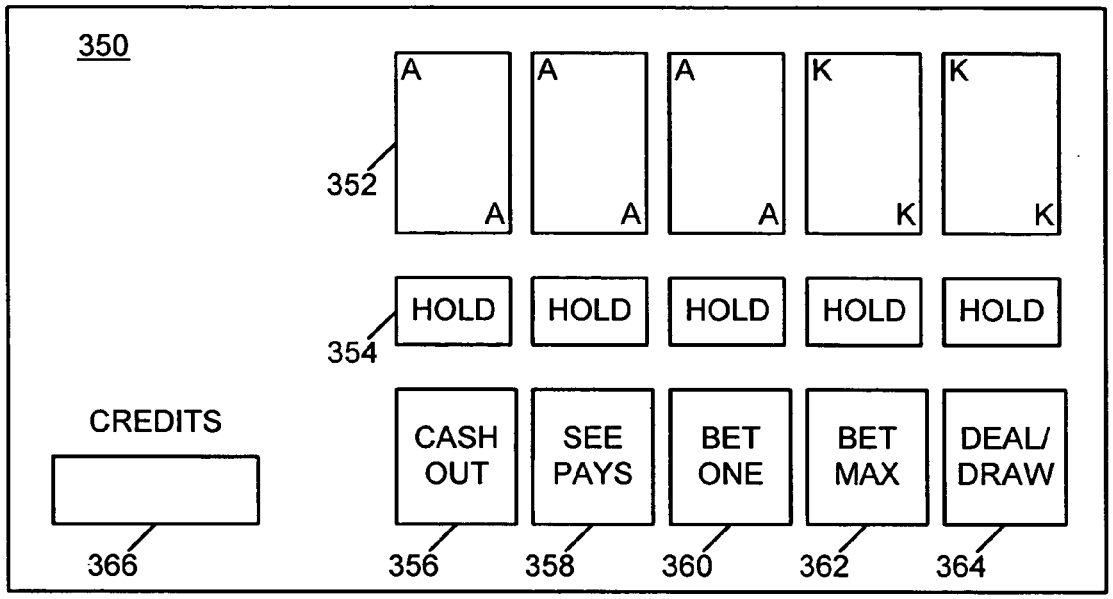
FIG. 10 is an illustration of an embodiment of a visual display that may be displayed during performance of the video poker routine of FIG. 12.

Video Poker

Where the gaming unit 20 is designed to facilitate play of a video poker game, the display unit 70 may comprise a video display unit. FIG. 10 is an exemplary display 350 that may be shown on the display unit 70 during performance of the video poker routine 210 shown schematically in FIG. 8. Referring to FIG. 10, the display 350 may include video images 352 of a plurality of playing cards representing the player's hand, such as five cards. To allow the player to control the play of the video poker game, a plurality of player-selectable buttons may be displayed. The buttons may include a "Hold" button 354 disposed directly below each of the playing card images 352, a "Cash Out" button 356, a "See Pays" button 358, a "Bet One Credit" button 360, a "Bet Max Credits" button 362, and a "Deal/Draw" button 364. The display 350 may also include an area 366 in which the number of remaining credits or value is displayed. If the display unit 70 is provided with a touch-sensitive screen, the buttons 354, 356, 358, 360, 362, 364 may form part of the video display 350. Alternatively, one or more of those buttons may be provided as part of a control panel that is provided separately from the display unit 70.

Figure 12:
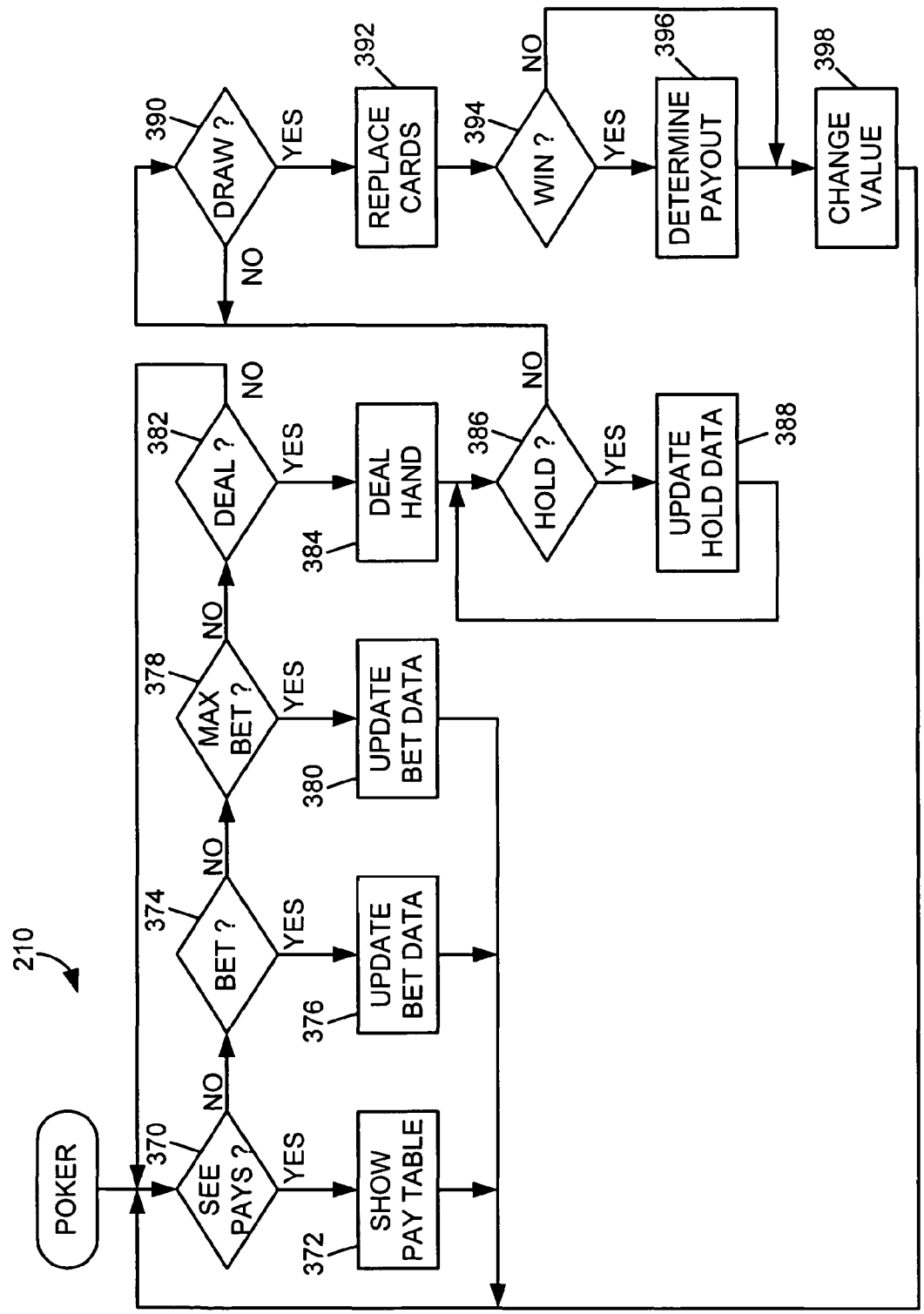
FIG. 12 is a flowchart of an embodiment of a video poker routine that may be performed by one or more of the gaming units.

FIG. 12 is a flowchart of the video poker routine 210 shown schematically in FIG. 8. Referring to FIG. 12, at block 370, the routine may determine whether the player has requested payout information, such as by activating the "See Pays" button 358, in which case at block 372 the routine may cause one or more pay tables to be displayed on the display unit 70. At block 374, the routine may determine whether the player has made a bet, such as by pressing the "Bet One Credit" button 360, in which case at block 376 bet data corresponding to the bet made by the player may be stored in the memory of the controller 100. At block 378, the routine may determine whether the player has pressed the "Bet Max Credits" button 362, in which case at block 380 bet data corresponding to the maximum allowable bet may be stored in the memory of the controller 100.

At block 382, the routine may determine if the player desires a new hand to be dealt, which may be determined by detecting if the "Deal/Draw" button 364 was activated after a wager was made. In that case, at block 384 a video poker hand may be "dealt" by causing the display unit 70 to generate the playing card images 352. After the hand is dealt, at block 386 the routine may determine if any of the "Hold" buttons 354 have been activated by the player, in which case data regarding which of the playing card images 352 are to be "held" may be stored in the controller 100 at block 388. If the "Deal/Draw" button 364 is activated again as determined at block 390, each of the playing card images 352 that was not "held" may be caused to disappear from the video display 350 and to be replaced by a new, randomly selected, playing card image 352 at block 392.

At block 394, the routine may determine whether the poker hand represented by the playing card images 352 currently displayed is a winner. That determination may be made by comparing data representing the currently displayed poker hand with data representing all possible winning hands, which may be stored in the memory of the controller 100. If there is a winning hand, a payout value corresponding to the winning hand may be determined at block 396. At block 398, the player's cumulative value or number of credits may be updated by subtracting the bet made by the player and adding, if the hand was a winner, the payout value determined at block 396. The cumulative value or number of credits may also be displayed in the display area 366 (FIG. 10).

Although the video poker routine 210 is described above in connection with a single poker hand of five cards, the routine 210 may be modified to allow other versions of poker to be played. For example, seven card poker may be played, or stud poker may be played. Alternatively, multiple poker hands may be simultaneously played. In that case, the game may begin by dealing a single poker hand, and the player may be allowed to hold certain cards. After deciding which cards to hold, the held cards may be duplicated in a plurality of different poker hands, with the remaining cards for each of those poker hands being randomly determined.

Figure 11:
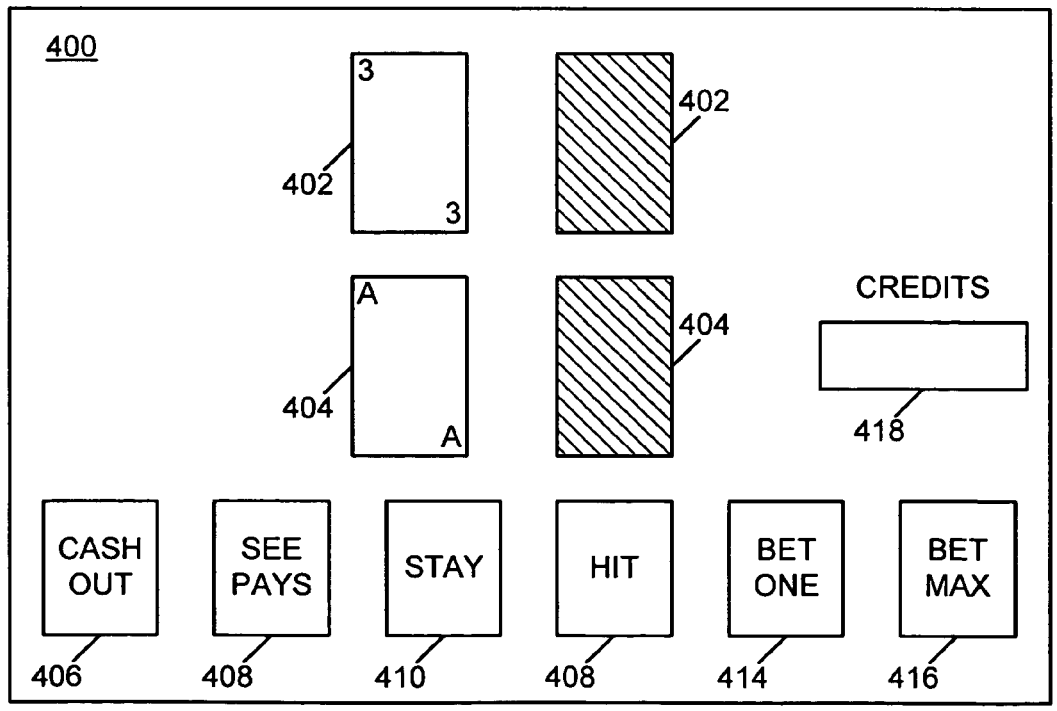
FIG. 11 is an illustration of an embodiment of a visual display that may be displayed during performance of the video blackjack routine of FIG. 13.

Video Blackjack

Where the gaming unit 20 is designed to facilitate play of a video blackjack game, the display unit 70 may comprise a video display unit. FIG. 11 is an exemplary display 400 that may be shown on the display unit 70 during performance of the video blackjack routine 220 shown schematically in FIG. 8. Referring to FIG. 11, the display 400 may include video images 402 of a pair of playing cards representing a dealer's hand, with one of the cards shown face up and the other card being shown face down, and video images 404 of a pair of playing cards representing a player's hand, with both the cards shown face up. The "dealer" may be the gaming unit 20.

To allow the player to control the play of the video blackjack game, a plurality of player-selectable buttons may be displayed. The buttons may include a "Cash Out" button 406, a "See Pays" button 408, a "Stay" button 410, a "Hit" button 412, a "Bet One Credit" button 414, and a "Bet Max Credits" button 416. The display 400 may also include an area 418 in which the number of remaining credits or value is displayed. If the display unit 70 is provided with a touch-sensitive screen, the buttons 406, 408, 410, 412, 414, 416 may form part of the video display 400. Alternatively, one or more of those buttons may be provided as part of a control panel that is provided separately from the display unit 70.

Figure 13:
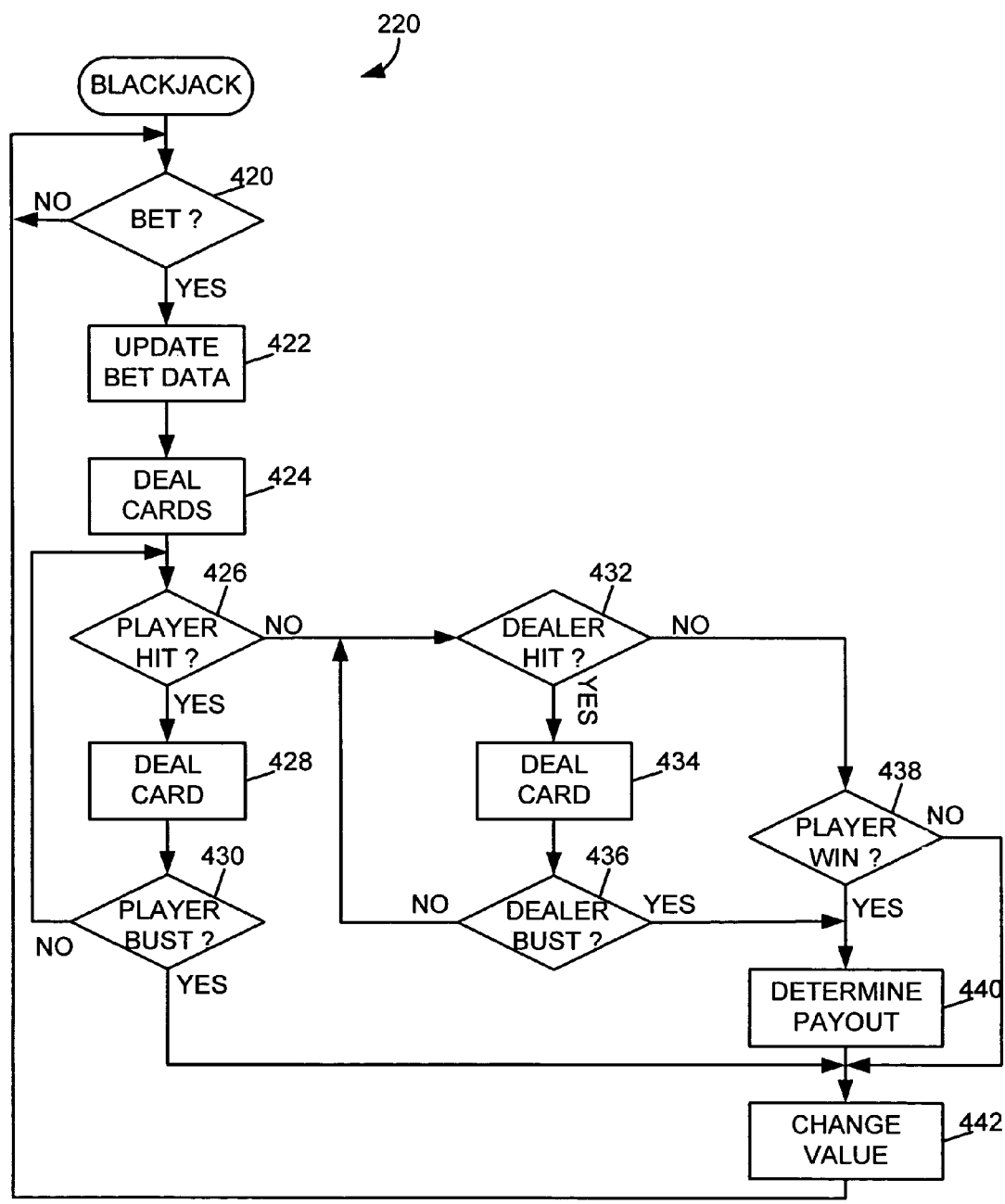
FIG. 13 is a flowchart of an embodiment of a video blackjack routine that may be performed by one or more of the gaming units.

FIG. 13 is a flowchart of the video blackjack routine 220 shown schematically in FIG. 8. Referring to FIG. 13, the video blackjack routine 220 may begin at block 420 where it may determine whether a bet has been made by the player. That may be determined, for example, by detecting the activation of either the "Bet One Credit" button 414 or the "Bet Max Credits" button 416. At block 422, bet data corresponding to the bet made at block 420 may be stored in the memory of the controller 100. At block 424, a dealer's hand and a player's hand may be "dealt" by making the playing card images 402, 404 appear on the display unit 70.

At block 426, the player may be allowed to be "hit," in which case at block 428 another card will be dealt to the player's hand by making another playing card image 404 appear in the display 400. If the player is hit, block 430 may determine if the player has "bust," or exceeded 21. If the player has not bust, blocks 426 and 428 may be performed again to allow the player to be hit again.

If the player decides not to hit, at block 432 the routine may determine whether the dealer should be hit. Whether the dealer hits may be determined in accordance with predetermined rules, such as the dealer always hit if the dealer's hand totals 15 or less. If the dealer hits, at block 434 the dealer's hand may be dealt another card by making another playing card image 402 appear in the display 400. At block 436 the routine may determine whether the dealer has bust. If the dealer has not bust, blocks 432, 434 may be performed again to allow the dealer to be hit again.

If the dealer does not hit, at block 436 the outcome of the blackjack game and a corresponding payout may be determined based on, for example, whether the player or the dealer has the higher hand that does not exceed 21. If the player has a winning hand, a payout value corresponding to the winning hand may be determined at block 440. At block 442, the player's cumulative value or number of credits may be updated by subtracting the bet made by the player and adding, if the player won, the payout value determined at block 440. The cumulative value or number of credits may also be displayed in the display area 418 (FIG. 11).

Figure 14:
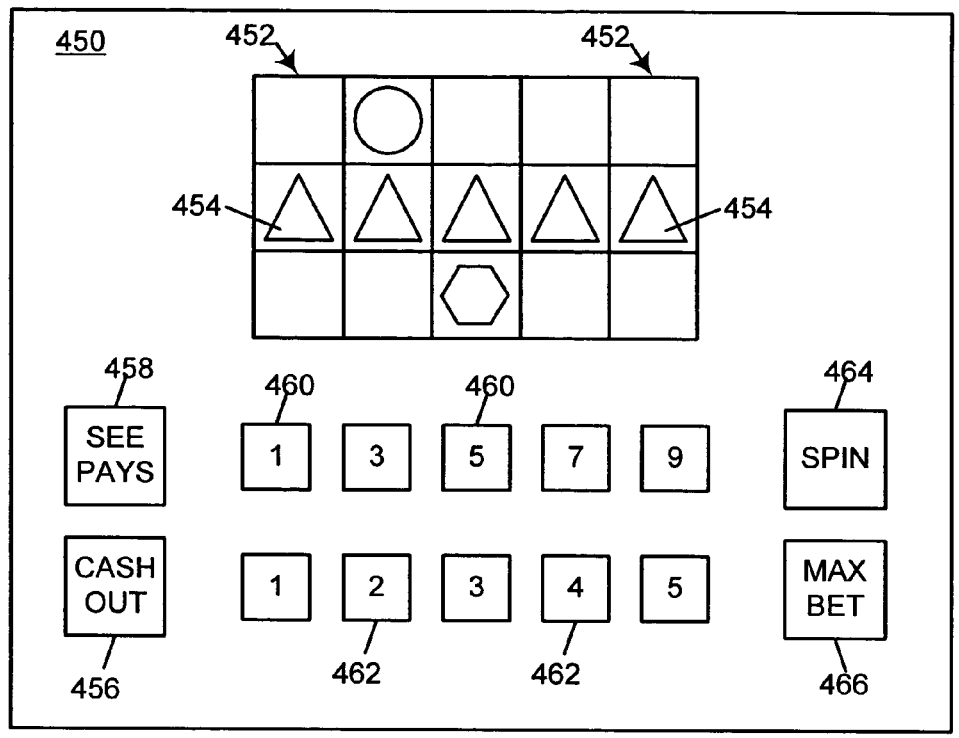
FIG. 14 is an illustration of an embodiment of a visual display that may be displayed during performance of the slots routine of FIG. 16.

Slots

Where the gaming unit 20 is designed to facilitate play of a video slots game, the display unit 70 may comprise a video display unit. FIG. 14 is an exemplary display 450 that may be shown on the display unit 70 during performance of the slots routine 230 shown schematically in FIG. 8. Referring to FIG. 14, the display 450 may include video images 452 of a plurality of slot machine reels, each of the reels having a plurality of reel symbols 454 associated therewith. Although the display 450 shows five reel images 452, each of which may have three reel symbols 454 that are visible at a time, other reel configurations could be utilized.

To allow the player to control the play of the slots game, a plurality of player-selectable buttons may be displayed. The buttons may include a "Cash Out" button 456, a "See Pays" button 458, a plurality of payline-selection buttons 460 each of which allows the player to select a different number of paylines prior to "spinning" the reels, a plurality of bet-selection buttons 462 each of which allows a player to specify a wager amount for each payline selected, a "Spin" button 464, and a "Max Bet" button 466 to allow a player to make the maximum wager allowable.

Figure 16:
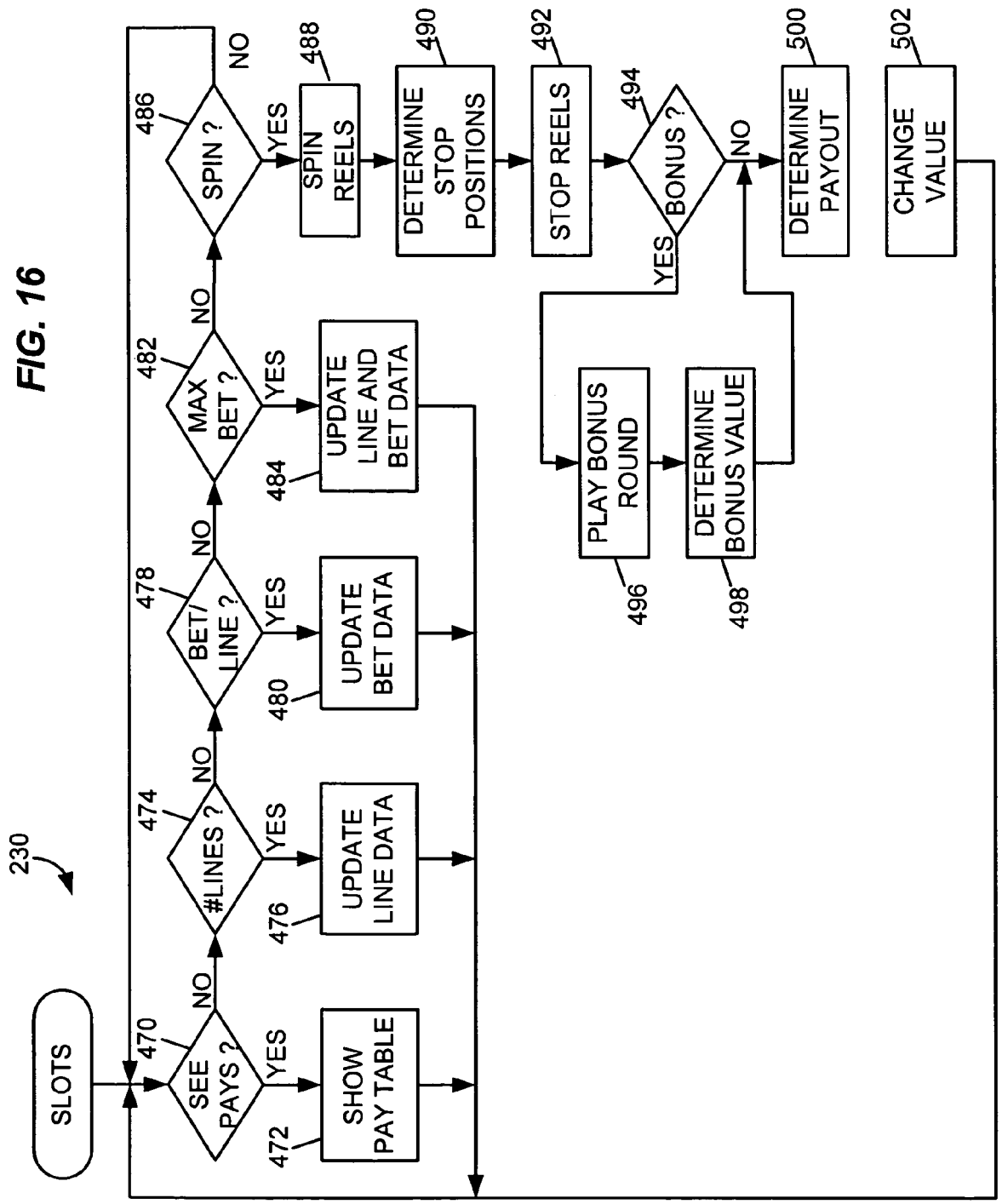
FIG. 16 is a flowchart of an embodiment of a slots routine that may be performed by one or more of the gaming units.

FIG. 16 is a flowchart of the slots routine 230 shown schematically in FIG. 8. Referring to FIG. 16, at block 470, the routine may determine whether the player has requested payout information, such as by activating the "See Pays" button 458, in which case at block 472 the routine may cause one or more pay tables to be displayed on the display unit 70. At block 474, the routine may determine whether the player has pressed one of the payline-selection buttons 460, in which case at block 476 data corresponding to the number of paylines selected by the player may be stored in the memory of the controller 100. At block 478, the routine may determine whether the player has pressed one of the bet-selection buttons 462, in which case at block 480 data corresponding to the amount bet per payline may be stored in the memory of the controller 100. At block 482, the routine may determine whether the player has pressed the "Max Bet" button 466, in which case at block 484 bet data (which may include both payline data and bet-per-payline data) corresponding to the maximum allowable bet may be stored in the memory of the controller 100.

If the "Spin" button 464 has been activated by the player as determined at block 486, at block 488 the routine may cause the slot machine reel images 452 to begin "spinning" so as to simulate the appearance of a plurality of spinning mechanical slot machine reels. At block 490, the routine may determine the positions at which the slot machine reel images will stop, or the particular symbol images 454 that will be displayed when the reel images 452 stop spinning. At block 492, the routine may stop the reel images 452 from spinning by displaying stationary reel images 452 and images of three symbols 454 for each stopped reel image 452. The virtual reels may be stopped from left to right, from the perspective of the player, or in any other manner or sequence.

The routine may provide for the possibility of a bonus game or round if certain conditions are met, such as the display in the stopped reel images 452 of a particular symbol 454. If there is such a bonus condition as determined at block 494, the routine may proceed to block 496 where a bonus round may be played. The bonus round may be a different game than slots, and many other types of bonus games could be provided. If the player wins the bonus round, or receives additional credits or points in the bonus round, a bonus value may be determined at block 498. A payout value corresponding to outcome of the slots game and/or the bonus round may be determined at block 500. At block 502, the player's cumulative value or number of credits may be updated by subtracting the bet made by the player and adding, if the slot game and/or bonus round was a winner, the payout value determined at block 500.

Although the above routine has been described as a virtual slot machine routine in which slot machine reels are represented as images on the display unit 70, actual slot machine reels that are capable of being spun may be utilized instead, in which case the display unit 70 could be provided in the form of a plurality of mechanical reels that are rotatable, each of the reels having a plurality of reel images disposed thereon.

Figure 15:
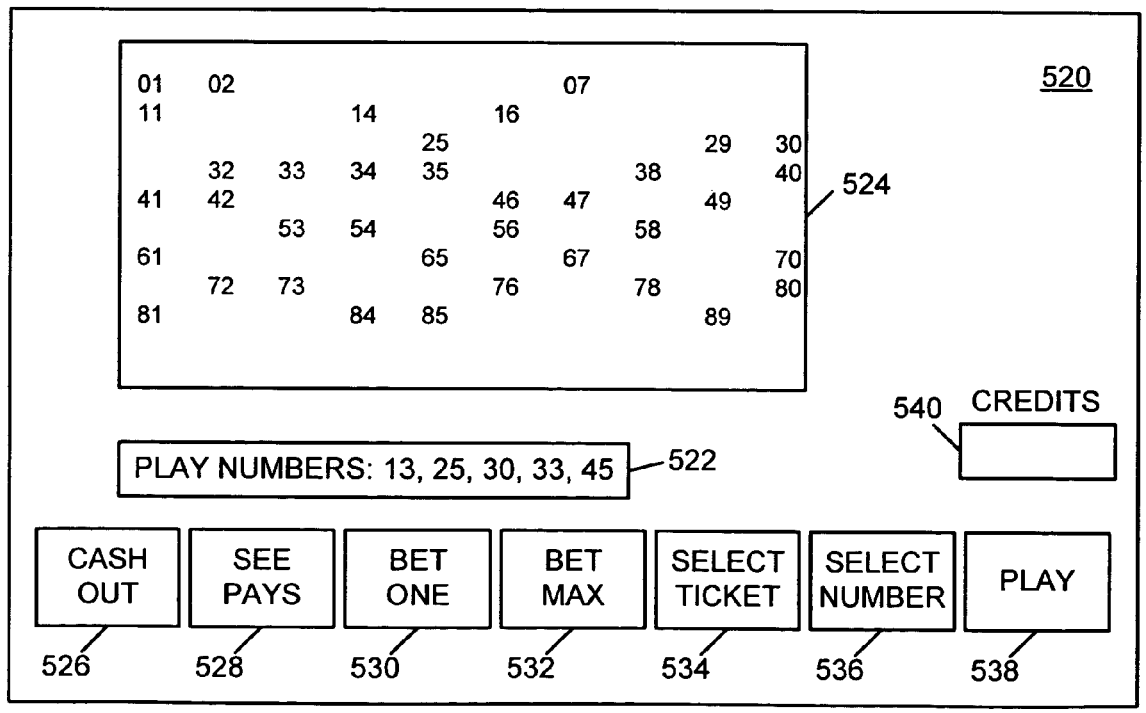
FIG. 15 is an illustration of an embodiment of a visual display that may be displayed during performance of the video keno routine of FIG. 17.

Video Keno

Where the gaming unit 20 is designed to facilitate play of a video keno game, the display unit 70 may comprise a video display unit. FIG. 15 is an exemplary display 520 that may be shown on the display unit 70 during performance of the video keno routine 240 shown schematically in FIG. 8. Referring to FIG. 15, the display 520 may include a video image 522 of a plurality of numbers that were selected by the player prior to the start of a keno game and a video image 524 of a plurality of numbers randomly selected during the keno game. The randomly selected numbers may be displayed in a grid pattern.

To allow the player to control the play of the keno game, a plurality of player-selectable buttons may be displayed. The buttons may include a "Cash Out" button 526, a "See Pays" button 528, a "Bet One Credit" button 530, a "Bet Max Credits" button 532, a "Select Ticket" button 534, a "Select Number" button 536, and a "Play" button 538. The display 520 may also include an area 540 in which the number of remaining credits or value is displayed. If the display unit 70 is provided with a touch-sensitive screen, the buttons may form part of the video display 520. Alternatively, one or more of those buttons may be provided as part of a control panel that is provided separately from the display unit 70.

Figure 17:
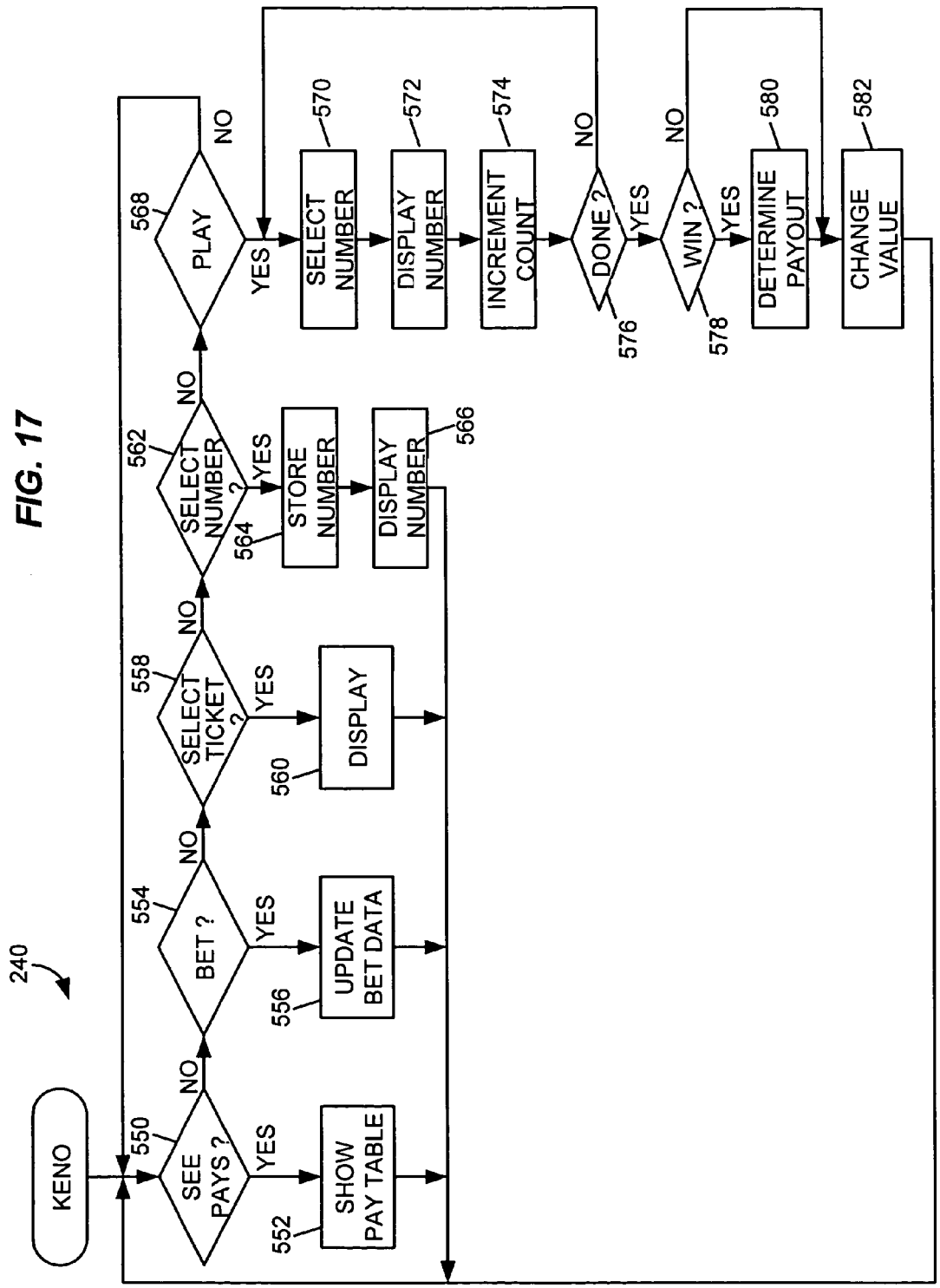
FIG. 17 is a flowchart of an embodiment of a video keno routine that may be performed by one or more of the gaming units.

FIG. 17 is a flowchart of the video keno routine 240 shown schematically in FIG. 8. The keno routine 240 may be utilized in connection with a single gaming unit 20 where a single player is playing a keno game, or the keno routine 240 may be utilized in connection with multiple gaming units 20 where multiple players are playing a single keno game. In the latter case, one or more of the acts described below may be performed either by the controller 100 in each gaming unit or by one of the network computer 22, 32 to which multiple gaming units 20 are operatively connected.

Referring to FIG. 17, at block 550, the routine may determine whether the player has requested payout information, such as by activating the "See Pays" button 528, in which case at block 552 the routine may cause one or more pay tables to be displayed on the display unit 70. At block 554, the routine may determine whether the player has made a bet, such as by having pressed the "Bet One Credit" button 530 or the "Bet Max Credits" button 532, in which case at block 556 bet data corresponding to the bet made by the player may be stored in the memory of the controller 100. After the player has made a wager, at block 558 the player may select a keno ticket, and at block 560 the ticket may be displayed on the display 520. At block 562, the player may select one or more game numbers, which may be within a range set by the casino. After being selected, the player's game numbers may be stored in the memory of the controller 100 at block 564 and may be included in the image 522 on the display 520 at block 566. After a certain amount of time, the keno game may be closed to additional players (where a number of players are playing a single keno game using multiple gambling units 20).

If play of the keno game is to begin as determined at block 568, at block 570 a game number within a range set by the casino may be randomly selected either by the controller 100 or a central computer operatively connected to the controller, such as one of the network computers 22, 32. At block 572, the randomly selected game number may be displayed on the display unit 70 and the display units 70 of other gaming units 20 (if any) which are involved in the same keno game. At block 574, the controller 100 (or the central computer noted above) may increment a count which keeps track of how many game numbers have been selected at block 570.

At block 576, the controller 100 (or one of the network computers 22, 32) may determine whether a maximum number of game numbers within the range have been randomly selected. If not, another game number may be randomly selected at block 570. If the maximum number of game numbers has been selected, at block 578 the controller 100 (or a central computer) may determine whether there are a sufficient number of matches between the game numbers selected by the player and the game numbers selected at block 570 to cause the player to win. The number of matches may depend on how many numbers the player selected and the particular keno rules being used.

If there are a sufficient number of matches, a payout may be determined at block 580 to compensate the player for winning the game. The payout may depend on the number of matches between the game numbers selected by the player and the game numbers randomly selected at block 570. At block 582, the player's cumulative value or number of credits may be updated by subtracting the bet made by the player and adding, if the keno game was won, the payout value determined at block 580. The cumulative value or number of credits may also be displayed in the display area 540 (FIG. 15).

Figure 18:
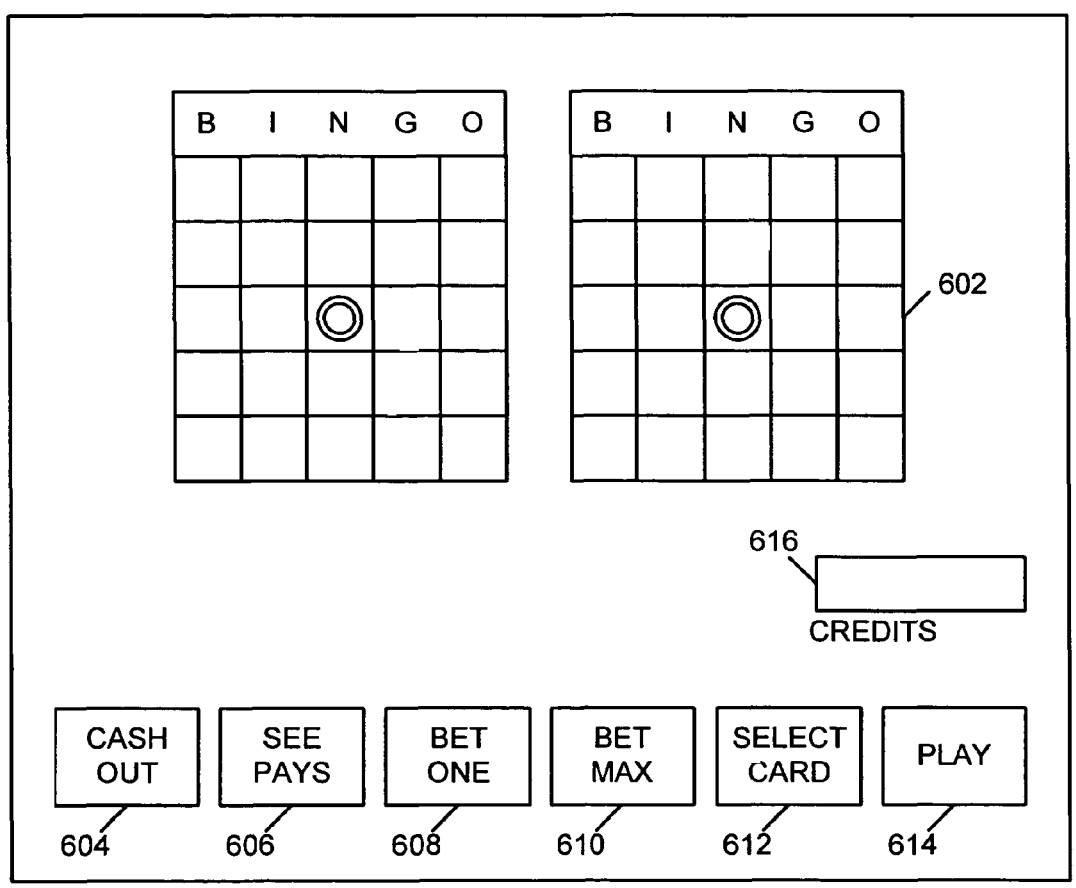
FIG. 18 is an illustration of an embodiment of a visual display that may be displayed during performance of the video bingo routine of FIG. 19.

Video Bingo

Where the gaming unit 20 is designed to facilitate play of a video bingo game, the display unit 70 may comprise a video display unit. FIG. 18 is an exemplary display 600 that may be shown on the display unit 70 during performance of the video bingo routine 250 shown schematically in FIG. 8. Referring to FIG. 18, the display 600 may include one or more video images 602 of a bingo card and images of the bingo numbers selected during the game. The bingo card images 602 may have a grid pattern.

To allow the player to control the play of the bingo game, a plurality of player-selectable buttons may be displayed. The buttons may include a "Cash Out" button 604, a "See Pays" button 606, a "Bet One Credit" button 608, a "Bet Max Credits" button 610, a "Select Card" button 612, and a "Play" button 614. The display 600 may also include an area 616 in which the number of remaining credits or value is displayed. If the display unit 70 is provided with a touch-sensitive screen, the buttons may form part of the video display 600. Alternatively, one or more of those buttons may be provided as part of a control panel that is provided separately from the display unit 70.

FIG. 19 is a flowchart of the video bingo routine 250 shown schematically in FIG. 8. The bingo routine 250 may be utilized in connection with a single gaming unit 20 where a single player is playing a bingo game, or the bingo routine 250 may be utilized in connection with multiple gaming units 20 where multiple players are playing a single bingo game. In the latter case, one or more of the acts described below may be performed either by the controller 100 in each gaming unit 20 or by one of the network computers 22, 32 to which multiple gaming units 20 are operatively connected.

Referring to FIG. 19, at block 620, the routine may determine whether the player has requested payout information, such as by activating the "See Pays" button 606, in which case at block 622 the routine may cause one or more pay tables to be displayed on the display unit 70. At block 624, the routine may determine whether the player has made a bet, such as by having pressed the "Bet One Credit" button 608 or the "Bet Max Credits" button 610, in which case at block 626 bet data corresponding to the bet made by the player may be stored in the memory of the controller 100.

After the player has made a wager, at block 628 the player may select a bingo card, which may be generated randomly. The player may select more than one bingo card, and there may be a maximum number of bingo cards that a player may select. After play is to commence as determined at block 632, at block 634 a bingo number may be randomly generated by the controller 100 or a central computer such as one of the network computers 22, 32. At block 636, the bingo number may be displayed on the display unit 70 and the display units 70 of any other gaming units 20 involved in the bingo game.

At block 638, the controller 100 (or a central computer) may determine whether any player has won the bingo game. If no player has won, another bingo number may be randomly selected at block 634. If any player has bingo as determined at block 638, the routine may determine at block 640 whether the player playing that gaming unit 20 was the winner. If so, at block 642 a payout for the player may be determined. The payout may depend on the number of random numbers that were drawn before there was a winner, the total number of winners (if there was more than one player), and the amount of money that was wagered on the game. At block 644, the player's cumulative value or number of credits may be updated by subtracting the bet made by the player and adding, if the bingo game was won, the payout value determined at block 642. The cumulative value or number of credits may also be displayed in the display area 616 (FIG. 18).

What is claimed is:

1. A gaming system comprising:
a first network gaming device, a second network gaming device and a gaming security arbiter;
the first network gaming device being operatively coupled to said gaming security arbiter, and comprising a first network gaming device controller configured to (i) transmit a request to said gaming security arbiter for a communication session with said second network gaming device, (ii) receive said first encryption key from said gaming security arbiter, (iii) create an encrypted message from a message content using said first encryption key, and (iv) transmit said encrypted message to said second network gaming device;
the second network gaming device being operatively coupled to said first network gaming device and said gaming security arbiter, and comprising a second network gaming device controller configured to (i) receive said second encryption key from said gaming security arbiter, (ii) receive said encrypted message from said first network gaming device, and (iii) decrypt said encrypted message using said second encryption key, and:
at least one of said first and second network gaming device controllers is configured to request, according to a security level relating to said message, a respective encryption, key, said first network gaming device controller being configured to encrypt said message according to said security level; and
the gaming security arbiter comprising an arbiter controller configured to (i) receive a request from the first network gaming device, said request comprising a request for a communication session between said first network gaming device and the second network gaming device, (ii) provide a first encryption key to said first network gaming device, and (iii) provide a second encryption key to said second network gaming device;

wherein:
said arbiter controller is further configured to:
communicate with the first network gaming device and a host;
determine encryption methods supported by the host and by the first network gaming device;
select an encryption method supported by both the first network gaming device and the host, and
select the first and second encryption keys based on both the supported methods and the security level related to said message.

2. A gaming system as defined in claim 1,
wherein said arbiter controller is programmed to encrypt said first and second encryption keys,
wherein said first network gaming device controller is programmed to decrypt said first encryption key,
wherein said second network gaming device controller is programmed to decrypt said second encryption key.

3. A gaming system as defined in claim 1,
wherein said arbiter controller is programmed to receive data from at least one of the first and second network gaming devices, said data relating to one or more of the following: services data relating to one or more services provided by at least one of said first and second network gaming devices, resources data relating to one or more resources provided by at least one of said first and second network gaming devices, capabilities data relating to capabilities of at least one of said first and second network gaming devices,
wherein said arbiter controller is programmed to select said second network gaming device based on said data received from said second network gaming device.

4. A gaming system as defined in claim 1,
wherein said arbiter controller is programmed to determine parameters for said communication session,
wherein said first and second network gaming device controllers are programmed to cause said first and second network gaming devices to communicate in accordance with said communication parameters.

5. A gaming system as defined in claim 1, wherein:
said arbiter controller is programmed to provide said first network gaming device controller with data regarding one or more network gaming devices, and
said first network gaming device controller is programmed to select said second network gaming device from said one or more network gaming devices based on said data.

6. A gaming system as defined in claim 1, wherein:
said arbiter controller is programmed to provide said first network gaming device controller with a plurality of encryption keys, and
said first network gaming device controller is programmed to select said first encryption key from said plurality of encryption keys.

7. A gaming system as defined in claim 1, wherein:
said first network gaming device controller is programmed to include an encryption key identifier with said encrypted message, wherein said encryption key identifier identifies said first encryption key, and
said second network gaming device controller is programmed to select said second encryption key based on said encryption key identifier.

8. A gaming system as defined in claim 1, wherein:
said second network gaming device controller is programmed to request confirmation of the authenticity of said first network gaming device from said gaming security arbiter, said arbiter controller is programmed to provide confirmation of the authenticity of said first network gaming device to the second network gaming device, and said second network gaming device controller is programmed to receive and decrypt said encrypted message from said first network gaming device in response to said confirmation.

9. A gaming system as defined in claim 1, wherein said at least one of said first and second network gaming devices comprises one of the following: a gaming unit or a network computer.

* * * * *